US010826088B2

(12) United States Patent
Scotto et al.

(10) Patent No.: US 10,826,088 B2
(45) Date of Patent: *Nov. 3, 2020

(54) METHODS FOR TRANSITIONING A FUEL CELL SYSTEM BETWEEN MODES OF OPERATION

(71) Applicant: LG Electronics, Inc., Seoul (KR)

(72) Inventors: Mark V. Scotto, Uniontown, OH (US); Ted Ohrn, Alliance, OH (US); Shung-Ik Lee, Canton, OH (US); JaeBong Choi, Massillon, OH (US)

(73) Assignee: LG Electronics, Inc., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 15/887,720

(22) Filed: Feb. 2, 2018

(65) Prior Publication Data
US 2019/0245225 A1  Aug. 8, 2019

(51) Int. Cl.
*H01M 8/04302* (2016.01)
*H01M 8/04701* (2016.01)
*H01M 8/04746* (2016.01)
*H01M 8/2483* (2016.01)
*H01M 8/1246* (2016.01)
*H01M 8/124* (2016.01)

(52) U.S. Cl.
CPC .... *H01M 8/04302* (2016.02); *H01M 8/04708* (2013.01); *H01M 8/04753* (2013.01); *H01M 8/1246* (2013.01); *H01M 8/2483* (2016.02); *H01M 2008/1293* (2013.01)

(58) Field of Classification Search
CPC .......... H01M 8/04302; H01M 8/2483; H01M 8/04708; H01M 8/04753; H01M 8/1246
See application file for complete search history.

(56) References Cited

U.S. PATENT DOCUMENTS

2004/0062973 A1* 4/2004 Agnew ............ H01M 8/04022
429/423

* cited by examiner

*Primary Examiner* — Jimmy Vo
(74) *Attorney, Agent, or Firm* — Dentons US LLP

(57) ABSTRACT

Systems and methods for transitioning a fuel cell system between operating modes. The fuel cell system may be a SOFC system comprising Ni-containing anodes. The transitions may be from a shutdown mode to a hot standby mode, from a hot standby mode to a power ready hot standby mode, from a power ready hot standby mode to an operating mode, from an operating mode to a power ready hot standby mode, from a power ready hot standby mode to a hot standby mode, from a hot standby mode to a shutdown mode, and from an operating mode to a shutdown mode.

21 Claims, 10 Drawing Sheets

METHODS FOR TRANSITIONING A FUEL CELL SYSTEM BETWEEN MODES OF OPERATION

CROSS-REFERENCE TO RELATED APPLICATIONS

This application is related to concurrently filed and U.S. application Ser. No. 15/887,701, filed Feb. 2, 2018, entitled "Methods for Transitioning a Fuel Cell System between Modes of Operation," U.S. Pat. No. 10,622,649, with named inventors Mark V. Scotto, Ted Ohrn, Shung-Ik Lee and JaeBong Choi; U.S. application Ser. No. 15/887,733, filed Feb. 2, 2018, entitled "Methods for Transitioning a Fuel Cell System between Modes of Operation," now abandoned, with named inventors Mark V. Scotto, Ted Ohrn, Shung-Ik Lee and JaeBong Choi; and co-pending U.S. application Ser. No. 15/887,742, filed Feb. 2, 2018, entitled "Methods for Transitioning a Fuel Cell System between Modes of Operation," with named inventors Mark V. Scotto, Ted Ohrn, Shung-Ik Lee and JaeBong Choi, each of these applications is hereby incorporated by reference.

FIELD

The present disclosure relates to fuel cell systems. More specifically, the present disclosure relates to methods for transitioning a fuel cell system between modes of operation.

BACKGROUND

A fuel cell is an electrochemical conversion device that produces electricity by oxidizing a fuel. A fuel cell typically includes an anode, a cathode, and an electrolyte located between the anode and the cathode. A fuel cell system usually includes multiple fuel cells electrically connected to one another in series via interconnects (sometimes collectively referred to as a "fuel cell unit") and several components configured to provide the fuel to the anodes of the fuel cells and an oxidant to the cathodes of the fuel cells. The oxygen in the oxidant is reduced at the cathode into oxygen ions that diffuse through the electrolyte layers into the anodes. The fuel is oxidized at the anodes, which gives off electrons that flow through an electrical load.

Solid oxide fuel cell (SOFC) systems have an electrolyte formed of solid oxide or ceramic and offer high efficiency and low emissions. Most SOFC anodes include Ni. One disadvantage of SOFC systems is that SOFCs require a relatively high operating temperature—usually between 800 degrees centigrade and 1000 degrees centigrade—to maintain low internal electrical resistance and achieve optimal performance. This high temperature leads to another problem. When the oxygen concentration over the anode of an SOFC exceeds a certain level at temperatures greater than about 300 degrees centigrade to about 400 degrees centigrade (referred to as the "oxidation temperature" in this Background section), anode oxidation may occur. Anode oxidation can eventually lead to anode cracking and declining SOFC system performance depending on the severity of the oxidation.

For instance, when an operator shuts down a typical SOFC system from an operating mode (at which the SOFC system is operating at an operating temperature of about 900 degrees centigrade) to a shut-down mode (at which the SOFC system is at ambient temperature), the SOFC system stops providing fuel to the anodes of the SOFCs. Air takes the place of the fuel. Since the fuel is no longer there to consume the oxygen ions that flow from the cathode to the anode, those oxygen ions accumulate at the anode and, eventually, reach a high enough concentration to oxidize at least some of the Ni in the anodes into NiO. The oxidation of Ni into NiO has two effects. First, the catalytic reactivity and electrical conductivity of the fuel cell anode, both of which are required to drive the electrochemical reaction and produce power, are essentially eliminated. Second, the volume of the anode increases, potentially leading to microstructural (or even macro-structural) damage of the anode, the severity of which depends on the magnitude of the volume change and/or it's frequency.

To prevent these effects, the typical operation of a SOFC system uses a reducing gas that is continually flowed over the anodes during cool down to protect the fuel cell anode from Ni oxidation. This reducing gas is applied from the time that the SOFC fuel flow to the SOFC system is stopped until the SOFC system reaches a temperature that is too low (about 300 C) for the oxidation reaction rate to be significant. The reducing gas, also referred to as transition gas, may be any gas that will reactively consume oxygen.

Similar oxidation effects may occur when the operator re-starts the SOFC system from a shut-down mode at ambient temperature because SOFC fuel is typically not provided to the anodes until the SOFC unit reaches its operating temperature. The absence of SOFC fuel at the anodes during heat-up may result in Ni oxidation of the anodes unless a reducing gas is continually fed to the fuel cell anodes during any heat-up of the SOFC unit above 300 degrees Celsius.

The Ni oxidation of the anodes may be reversible depending on the extent and severity of the oxidation. If an oxidized fuel cell anode is exposed to a transition gas having sufficient hydrogen at an elevated temperature (e.g., the operating temperature), the NiO will be reduced to Ni, restoring the catalytic activity and electrical conductivity of the anode. However, if the Ni oxidation occurs at a sufficiently high temperature, such as that temperature immediately after the initiation of a cool down of the SOFC system (essentially the operating temperature), the anode oxidation has been observed to be more severe and will more likely lead to an irreversible degradation in performance of the fuel cell system. It is hypothesized that oxygen more rapidly and effectively penetrates the Ni particle at higher temperatures, yielding a larger volume change of, and therefore, greater microstructural damage to the anode. Microstructural damage may cause the Ni particles to separate from the membrane material (i.e., the electrolyte), decreasing the available surface area of the reactive triple point, thereby decreasing fuel cell reactivity and overall efficiency power-production efficiency.

Additionally, the effects of the anode oxidation may be amplified by repetitive oxidation and reduction cycles, particularly for cycles having more severe oxidation. Over time, the high-temperature Ni oxidation and corresponding swelling of the anode can cause more severe damage than a single event. This damage may be further amplified by any reduction of the NiO that causes a subsequent shrinking of the anode. Ultimately, these effects can cause macro-structural damage to the anode in the form of visible cracks and delamination (separation) of the fuel cell layers from one another. Macro-structural damage can lead to catastrophic failures of the fuel cell system due to fuel leaks.

One solution to avoid Ni oxidation of the fuel cell anodes, and the resulting fuel cell performance degradation, is to continually provide a reducing gas (also known as a transition gas), typically a mixture of $H_2$ and $N_2$, to the fuel cell anodes whenever the SOFC system is at or above a temperature at which Ni oxidation may occur and SOFC fuel is not being provided to the fuel cell system. The hydrogen gas consumes any oxygen ions that flow from the cathode, thereby preventing the anodes from oxidizing above a temperature of 300° C. Consequently, the fuel cell anodes are never exposed to oxidizing conditions after their initial reduction in this approach. However, this solution is resource intensive and expensive as it requires a large volumes of highly $H_2$— enriched transition gas. The only practical means to supply this gas is with an external system that catalytically converts pipeline natural gas and air to a rich mixture of $H_2$ and CO (CO will also act as a reducing agent by consuming $O_2$).

Another solution utilizes applies a reverse current bias (RCB) to the fuel cell system. The reverse current resulting from the RCB generates $O_2$ and $H_2$ from water and drives $O_2$ back to the cathode, thereby reducing the amount of $O_2$ that collects at the anodes. The RCB applied to the fuel cell system can be controlled to balance the forward reaction (generating $H_2O$ from the reaction of $H_2$ with $O_2$) and reverse reactions (breaking up water into $H_2$ and $O_2$ and driving $O_2$ back to the cathode).

These two solutions, providing a transition gas and applying a RCB to the fuel cell system, can be combined to reduce cost associated with the generation of $H_2$-rich transition gas. The amount of $H_2$ generated externally to the fuel cell system and feed to the fuel anodes can be greatly reduced because $H_2$ can be generated using the RCB-driven reaction mentioned above. In theory, it is possible that the anodes may be protected from oxidation without providing an externally generated transition gas, although a finite amount of transition gas will always be required to accommodate air diffusion leakage from cathode to anode and to ensure adequate distribution of reducing gas over the entire fuel cell surface.

With this combined-solution approach, it is feasible to use pressurized bottles to store a reducing gas, that can be in the form of ≤5% $H_2$ in a balance of $N_2$, rather than generating large volumes of highly $H_2$-enriched transition gas. The use of stored transition gas is practical because amount of external-produced hydrogen needed to protect the anodes is reduced and, therefore, the quantity of transition gas to be stored at a plant site would not be unreasonable. A transition has having this lower $H_2$ concentration is also safer in all modes of operation since this gas will always fall below the lowest concentration required to form an explosive mixture when mixed with air. However, the footprint required for this stored gas is still undesirable. Additionally, the stored gas may need to be replaced frequently, e.g., after every start-up and shut down cycle of the power plant.

SUMMARY

Accordingly, there is a need for new and improved methods of transitioning a SOFC fuel cell system between operating modes that prevent fuel cell degradation from oxidation cycles while also minimizing the quantity of reducing gas needed to protect the fuel cell anodes from severe Ni oxidation.

It has been observed that if the anode oxidation occurs at an intermediate temperature (a temperature somewhere between the operating temperature of the fuel cell system and the temperature at which oxidation will not occur) or lower, the resultant power-production efficiency degradation from microstructural damage will be insignificant following the re-reduction of the anodes. It is hypothesized that this improvement occurs because oxygen does not as rapidly or as effectively penetrate into the Ni particle at this intermediate temperature. This reduced penetration may be caused by a relatively thin oxide layer that is impervious to the penetration of oxygen formed near the surface of the Ni particle, preventing oxidation deeper into Ni particles. Less and more-shallow oxidation results in a smaller volume change of the Ni particle compared to the more severe oxidation that can occur at higher temperatures. Additionally, Ni oxidation that occurs at an intermediate temperature is believed to yield a more recoverable reactivity after a high-temperature reduction than Ni oxidation occurring nearer the operating temperature. Finally, oxidation occurring at the intermediate temperature is less likely to lead to macro-structural damage than high-temperature oxidation.

The methods disclosed herein allow fuel cell oxidation at intermediate temperatures where, as described above, the anode Ni oxidation is hypothesized to be less severe, when compared to high temperature oxidation, and reversible. The fuel cell anodes may be re-reduced immediately prior to the start of power production after the fuel cell system has been heated to or near its operating temperature. The methods disclosed herein greatly reduce the amount of and time that the reducing-gas needs to be feed to the fuel cell anodes. Therefore, the amount of stored transition gas required to protect the fuel cell system is also reduced.

Further, prior to and during the cool down to the intermediate temperature at which less severe oxidation may occur, the methods disclosed herein apply a RCB to control the rate of fuel utilization and, therefore, minimize the flow rate of the transition gas required to protect the entire fuel cell anode surface. Controlling the fuel utilization rate allows for optimizing the forward and reverse reactions occurring at the anodes, providing for a greater margin to accommodate variations in the reducing gas flow that would otherwise risk anode oxidation.

Further methods described herein utilize a RCB and a hydrogen lean transition gas at a lower flow rate to effectively reduce oxidized fuel cell anodes. Once the fuel cell anode is reduced (restoring the anode reactivity and conductivity), the operation may briefly switch to a protection mode utilizing RCB, a higher fuel utilization, and a hydrogen lean transition gas at a low flowrate.

RCB may be applied to yield fuel utilization near 50%, a rate that is conducive to minimizing the transition gas flow rate required to protect the entire fuel cell surface. Controlling the fuel utilization to near 50% is optimal for both forward ($H_2$ consuming) and reverse ($H_2$ generating) reactions, and provides the most margin for handling variations in reducing gas flow that could risk fuel cell surface oxidation. Measuring the overall fuel utilization ensures that a minimal quantity of reducing gas can be applied to effectively prevent higher-temperature anode oxidation.

Further, methods described herein provide a manner to reduce fuel cell anodes. An oxidized fuel cell anode must be re-reduced or the production of power will not be possible or severely hampered. A hydrogen lean transition gas at reduced flow in combination with RCB will may be used to effectively reduce the fuel cell anode. This method of reducing the anodes not only uses less gas, it is also inherently safe because the concentration of hydrogen is lower (e.g., less than 5%). The Fuel utilization may be controlled at a lower value (to increase hydrogen concentration at the anode), to more effectively reduce the fuel cell anodes. Once the fuel cell is reactivated, operation can switch briefly to protection mode with RCB on where the preferred fuel utilization is about 50% as described above.

Further methods described herein transition a reduced fuel cell system to a power production mode in a manner that minimizes the use of transition gas. These methods may comprise increasing the flow rate of the transition gas to yield a sufficiently high steam-to-carbon ratio to accommodate the provision of SOFC fuel. In power production mode, a higher fuel utilization rate may be employed, however, a fuel utilization rate of 100% fuel is generally not used to ensure sufficient fuel is available to combine with oxygen at each anode. After the fuel cell is activated (reduced), it is desirable to get to power production mode as quickly as possible to conserve the transition gas. The transition to into a power production mode may require an increased flow rate of transition gas to yield a sufficiently high steam to carbon ratio for increasing quantities of SOFC (operating) fuel in the SOFC system. When the SOFC system is in a power production mode, a high fuel utilization rate may be used to optimize electrical efficiency. For example, a fuel utilization rate may be about 85%. High fuel utilization is limited by the residual heat necessary to sustain operating temperature.

Various embodiments of the present disclosure provide methods for transitioning a fuel cell system between modes of operation using varying amounts of a transition fuel and varying magnitudes of an applied reverse current bias (RCB) to control anode oxidation and reduction in a manner that avoids the above-described fuel cell degradation mechanisms.

In accordance with some embodiments of the present disclosure, a method of transitioning between operating modes of a fuel cell system is provided. The fuel cell system may comprise a fuel cell stack, an anode loop, a fuel supply conduit, a source of SOFC fuel, a source of transition fuel, a cathode loop, an oxidant supply conduit, and an oxidant source. The fuel cell stack may comprise a plurality of solid oxide fuel cells, each solid oxide fuel cell comprising an anode, a cathode, and an electrolyte. The anode loop may comprise an in-block fueling flowpath, an anode ejector, a fuel recycle conduit, and a combined fuel supply conduit. The in-block fueling flowpath may comprise a fuel supply manifold, a fuel exhaust manifold, and one or more fueling channels in fluid communication with said fuel supply manifold and said fuel exhaust manifold, wherein each anode is exposed to a fuel flowing in one or more of said fueling channels. The anode ejector may have a fuel supply input, a fuel recycle input, and a combined fuel output. The fuel recycle conduit may be in fluid communication with the anode ejector fuel recycle input and the in-block fueling flowpath fuel exhaust manifold. The combined fuel supply conduit may be in fluid communication with the anode ejector combined fuel output and the in-block fueling flowpath fuel supply manifold. The fuel supply conduit may be in fluid communication with the anode ejector fuel supply input. The source of SOFC fuel may be in fluid communication with the fuel supply conduit. The source of transition fuel may be n fluid communication with the fuel supply conduit. The cathode loop may comprise an in-block oxidizing flowpath, a cathode ejector, an oxidant recycle conduit, a combined oxidant supply conduit, and a heat source. The in-block oxidizing flowpath may comprise an oxidant supply manifold, an oxidant exhaust manifold, and one or more oxidizing channels in fluid communication with the oxidant supply manifold and the oxidant exhaust manifold, wherein each cathode is exposed to an oxidant flowing in one or more oxidizing channels. The cathode ejector may have an oxidant supply input, an oxidant recycle input, and a combined oxidant output. The oxidant recycle conduit may be in fluid communication with the cathode ejector oxidant recycle input and the in-block oxidizing flowpath oxidant exhaust manifold. The combined oxidant supply conduit may be in fluid communication with the cathode ejector combined oxidant output and the in-block oxidizing flowpath oxidant supply manifold. The heat source may be positioned to heat an oxidant flowing in the cathode loop. The oxidant supply conduit may be in fluid communication with the cathode ejector oxidant supply input. The oxidant source may be in fluid communication with the oxidant supply conduit.

The method of transitioning between operating modes of a fuel cell system may transition the fuel cell system from a shutdown mode to a hot standby mode. In the shutdown mode oxidant may be flowing through the cathode loop at an ambient temperature, no fuel may be flowing in the anode loop, and no RCB may be applied to the fuel cell stack. In the hot standby mode oxidant may flow through the cathode loop at a hot standby temperature, transition fuel may flow from the source into the anode loop at a mass flow rate sufficient to prevent oxidation of the anode, RCB may be applied to the fuel cell stack, and the anode fuel utilization is within an anode-protection fuel utilization range. The method may comprise maintaining flow of oxidant through the cathode loop, controlling a heat up of the fuel cell stack by controlling the mass flow rate and temperature of the oxidant flowing through the cathode loop, when the temperature of the fuel cell stack reaches a predetermined temperature between ambient temperature and hot standby temperature, flowing transition fuel into the anode loop at a mass flow rate sufficient to prevent anode oxidation, when the temperature of the fuel cell stack is at or below the predetermined temperature, applying RCB to the fuel cell stack, and maintaining control of the heat up of the fuel cell stack by controlling the mass flow rate and temperature of the oxidant flowing through the cathode loop until the temperature of the fuel cell stack reaches a hot standby temperature.

The method of transitioning between operating modes of a fuel cell system may transition the fuel cell system from a hot standby mode with the anodes in an oxidized condition to a hot standby mode with the anodes in a reduced condition. In the hot standby mode with the anodes in an oxidized condition oxidant may be flowing through the cathode loop at a hot standby temperature, no transition fuel may be flowing in the anode loop, and no SOFC fuel is flowing in the anode loop. In the hot standby mode with the anodes in a reduced condition oxidant may be flowing through the cathode loop at a hot standby temperature, transition fuel may be flowing from the source into the anode loop, RCB may be applied to the fuel cell stack, and the anode fuel utilization may be in an anode reduction range. The method may comprise maintaining flow of oxidant through the cathode loop, controlling the temperature of the fuel cell stack by controlling the mass flow rate and temperature of the oxidant flowing through the cathode loop, flowing transition fuel into the anode loop at a mass flow rate, applying RCB to the fuel cell stack, and controlling the anode fuel utilization by controlling the mass flow rate of the transition fuel and the magnitude of the RCB until the anodes are in a substantially reduced condition.

The method of transitioning between operating modes of a fuel cell system may transition the fuel cell system from a hot standby mode with anodes in a reduced condition to a power-ready hot standby mode. In the hot standby mode with anodes in a reduced condition, oxidant may be flowing through the cathode loop at a hot standby temperature, no SOFC fuel may be flowing into the anode loop, RCB may be applied to the fuel cell stack, transition fuel may be flowing into the anode loop at a relatively low mass flow rate, and anode fuel utilization may be in the range of 35% to 65%. In the power-ready hot standby mode, oxidant may be flowing through the cathode loop at a hot standby temperature, SOFC fuel may be flowing into the anode loop at a mass flow rate in the range of 2% to 5% of a full load mass flow rate, transition fuel may be flowing into the anode loop at a relatively high mass flow rate, no RCB may be applied to the fuel cell stack, and anode fuel utilization may be in the range of 35% to 90%. The method may comprise maintaining flow of oxidant through the cathode loop, controlling the temperature of the fuel cell stack by controlling the mass flow rate and temperature of the oxidant flowing through the cathode loop, flowing SOFC fuel into the anode loop at incrementally increasing mass flow rates until the mass flow rate is in a power-ready hot standby range of 1% to 5% of a full load mass flow rate, flowing transition fuel into the anode loop at a relatively high mass flow rate, applying an incrementally decreasing RCB while incrementally increasing the mass flow rate of the SOFC fuel until the RCB is zero and the mass flow rate of SOFC fuel into the anode loop is within the power-ready hot standby range, and controlling the anode fuel utilization by controlling the magnitude of the RCB or the mass flow rate of the transition fuel and the mass flow rate of the SOFC fuel into the anode loop.

The method of transitioning between operating modes of a fuel cell system may transition the fuel cell system from a power-ready hot standby mode to a shutdown mode. In the power-ready hot standby mode oxidant may be flowing through the cathode loop at a hot standby temperature, no SOFC fuel may be flowing into the anode loop, transition fuel may be flowing from the source into the anode loop at a mass flow rate sufficient to prevent oxidation of the anode, RCB may be applied to the fuel cell stack, and anode fuel utilization may be in the range of about 35% to about 65%. In the shutdown mode oxidant may be flowing through the cathode loop at ambient temperature, no SOFC fuel may be flowing into the anode loop, no transition fuel may be flowing into the anode loop, and no RCB may be applied to the fuel cell stack. The method may comprise maintaining flow of oxidant through the cathode loop, controlling a cool down of the fuel cell stack by controlling the mass flow rate or temperature of the oxidant flowing through the cathode loop, maintaining flow of transition fuel into the anode loop at a mass flow rate sufficient to prevent anode oxidation, maintaining the application of RCB to the fuel cell stack, when the temperature of the fuel cell stack lowers to a predetermined temperature between the hot standby temperature and ambient temperature, ceasing the flow of transition fuel into the anode loop, when the temperature of the fuel cell stack is at or below the predetermined temperature, ceasing application of RCB to the fuel cell stack, and maintaining control of the cool down of the fuel cell stack by controlling the mass flow rate or temperature of the oxidant flowing through the cathode loop until the temperature of the fuel cell stack is at ambient temperature.

In accordance with some embodiments of the present disclosure a method of transitioning a fuel cell system from a shutdown mode to a hot standby mode is provided. The fuel cell system may have a fuel cell stack comprising a plurality of solid oxide fuel cells, each fuel cell comprising an anode and a cathode spaced apart by an electrolyte, an anode loop for providing a fuel to the anodes, and a cathode loop for providing an oxidant to the cathodes. The conditions of the fuel cell system in the shutdown mode may include an oxidant flowing through the cathode loop at a mass flow rate in the range of about 50% to 100% of a full load mass flow rate at ambient temperature, no fuel is flowing in the anode loop, and no RCB is applied to the fuel cell stack. The conditions of the fuel cell system in the hot standby mode may include an oxidant flowing through the cathode loop at a mass flow rate in the range of about 50% to 100% of a full load mass flow rate at a temperature in the range of 800 C to 1000 C, transition fuel flowing from the source into the anode loop at a mass flow rate sufficient to prevent oxidation of the anode, RCB being applied to the fuel cell stack, and anode fuel utilization is with an anode-protection fuel utilization range. The method may comprise maintaining the flow of oxidant through the cathode loop at a mass flow rate in the range of about 50% to 100% of a full load mass flow rate, controlling the heat up of the fuel cell stack from ambient temperature to a predetermined temperature in the range of 600 C to 700 C by controlling the mass flow rate and temperature of the oxidant flowing through the cathode loop, when the fuel cell stack reaches a predetermined temperature between ambient temperature and the hot standby temperature, flowing the transition fuel into the anode loop at a mass flow rate sufficient to prevent oxidation of the anode; when the temperature of the fuel cell stack reaches the predetermined temperature or earlier, applying RCB to the fuel cell stack, and controlling the heat up of the fuel cell stack from the predetermined temperature to a hot standby temperature in the range of 800 C to 1000 C by controlling the mass flow rate and temperature of the oxidant flowing through the cathode loop.

In accordance with some embodiments of the present disclosure, a method of transitioning between operating modes of a fuel cell system having a fuel cell stack comprising a plurality of solid oxide fuel cells, each fuel cell comprising an anode and a cathode spaced apart by an electrolyte, an anode loop for providing a fuel to the anodes, and a cathode loop for providing an oxidant to the cathodes is provided. The conditions of the fuel cell system at the start of the transition may include the anodes being in an oxidized condition, an oxidant flowing through the cathode loop at a hot standby temperature in the range of 800 C to 1000 C, no SOFC fuel flowing in the anode loop, and no RCB being applied to the fuel cell stack. The conditions of the fuel cell system at the end of the transition may include the anodes in a reduced condition, an oxidant flowing through the cathode loop at a mass flow rate in the range of about 50% to 100% of a full load mass flow rate at a temperature in the range of 800 C to 1000 C, a transition fuel flowing from a source into the anode loop, RCB being applied to the fuel cell stack, and anode fuel utilization in the range of 5% to 35%. The method may comprise maintaining the flow of oxidant through the cathode loop at a mass flow rate in the range of about 50% to 100% of a full load mass flow rate, controlling the temperature of the fuel cell stack within the range of 800 C to 1000 C by controlling the mass flow rate and temperature of the oxidant flowing through the cathode loop. flowing the transition fuel into the anode loop, applying RCB to the fuel cell stack; and controlling an anode fuel utilization in the range of 35% to 65% by controlling the mass flow rate of the transition fuel and the magnitude of the RCB until the anodes are in a substantially reduced condition.

In accordance with some embodiments of the present disclosure, a method of transitioning between operating modes of a fuel cell system, the fuel cell system having a fuel cell stack comprising a plurality of solid oxide fuel cells, each fuel cell comprising an anode and a cathode spaced apart by an electrolyte, an anode loop for providing a fuel to the anodes, and a cathode loop for providing an oxidant to the cathodes is provided. The conditions of the fuel cell system at the start of the transition may include an oxidant flowing through the cathode loop at a temperature in the range of 800 C to 1000 C, no SOFC fuel flowing into the anode loop, RCB being applied to the fuel cell stack, transition fuel flowing into the anode loop at a relatively low mass flow rate, and anode fuel utilization in the range of 35% to 65%. The conditions of the fuel cell system at the end of the transition may include an oxidant flowing through the cathode loop at a temperature in the range of 800 C to 1000 C, SOFC fuel flowing into the anode loop at a mass flow rate of about 3% of a full load mass flow rate, transition fuel flowing into the anode loop at a relatively high mass flow rate, no RCB being applied to the fuel cell stack, and anode fuel utilization in the range of 35% to 90%. The method may comprise flowing oxidant through the cathode loop at a mass flow rate in the range of about 50% to 100% of a full load mass flow rate, controlling the temperature of the fuel cell stack within the range of 800 C to 1000 C by controlling the mass flow rate and temperature of the oxidant flowing through the cathode loop, flowing SOFC fuel into the anode loop at incrementally increasing mass flow rates until the mass flow rate is about 3% of a full load mass flow rate. flowing the transition fuel into the anode loop at a relatively high mass flow rate, applying an incrementally decreasing RCB to the fuel cell stack while incrementally increasing the mass flow rates of the SOFC fuel such that when the mass flow rate of SOFC fuel is about 3% of a full load mass flow rate the RCB is zero, and controlling an anode fuel utilization in the range of 35% to 90% by controlling the magnitude of the RCB or the mass flow rate of the transition fuel and the mass flow rate of the SOFC fuel into the anode loop.

In accordance with some embodiments of the present disclosure, a method of transitioning a fuel cell system from a power-ready hot standby mode to a shutdown mode, the fuel cell system having a fuel cell stack comprising a plurality of solid oxide fuel cells, each fuel cell comprising an anode and a cathode spaced apart by an electrolyte, an anode loop for providing a fuel to the anodes, and a cathode loop for providing an oxidant to the cathodes is provided. The conditions of the fuel cell system in a power-ready hot standby mode may include an oxidant flowing through the cathode loop at a mass flow rate in the range of about 50 to 100 of a full load mass flow rate at a temperature in the range of 800 C to 1000 C, no SOFC fuel flowing into the anode loop, a transition fuel flowing from a source into the anode loop at a mass flow rate sufficient to prevent oxidation of the anode, RCB being applied to the fuel cell stack, and anode fuel utilization in the range of about 35% to about 65%. The conditions of the fuel cell system in a shutdown mode may include an oxidant flowing through the cathode loop at a mass flow rate in the range of about 50% to 100% of a full load mass flow rate at ambient temperature, no SOFC fuel flowing into the anode loop, no transition fuel is flowing from the transition fuel source, and no RCB is applied to the fuel cell stack. The method may comprise maintaining flow of oxidant through the cathode loop at a mass flow rate in the range of about 50 to 100 of a full load mass flow rate, controlling the cool down of the fuel cell stack to ambient temperature by controlling the mass flow rate or temperature of the oxidant flowing through the cathode loop, maintaining flow of transition fuel into the anode loop at a mass flow rate sufficient to prevent anode oxidation during cool down of the fuel cell stack to a predetermined temperature in the range of 450 C to 700 C, then ceasing the flow of transition fuel into the anode loop when the temperature of the fuel cell stack is at the predetermined temperature, and maintaining the application of RCB to the fuel cell stack during cool down of the fuel cell stack to a temperature at or below the predetermined temperature, then ceasing the application of RCB to the fuel cell stack.

In accordance with some embodiments of the present disclosure, a method of transitioning a fuel cell system having a stack comprising a plurality of fuel cells from a shutdown mode at ambient temperature wherein the anodes of the fuel cells are substantially free of oxidized metal, to a hot standby mode at a temperature in the range of 800 C to 1000 C wherein the anodes of the fuel cells comprise oxidized metal is provided. The method may comprising flowing an oxidant in a cathode loop of the fuel cell system, heating the oxidant flowing in the cathode loop to thereby effect heating of the fuel cell stack, allowing oxidation of a metal contained in the anodes of the fuel cells while the fuel cell stack heats up to a predetermined temperature below the hot standby mode temperature, and inhibiting further oxidation of the metal in the anodes of the fuel cells while the fuel cell stack heats up from the predetermined temperature to the standby temperature by applying an RCB to the fuel cell stack while the fuel cell stack is at or below the predetermined temperature and flowing a transition fuel in an anode loop of the fuel cell system at a mass flow rate sufficient to prevent oxidation of the metal in the anodes.

In accordance with some embodiments of the present disclosure, a method of reducing fuel cell anodes in an oxidized condition at a hot standby temperature in the range of 800 C to 1000 C to a substantially reduced condition is provided. The method may comprise flowing an oxidant in a cathode loop of the fuel cell system, controlling the temperature of the oxidant flowing in the cathode loop to thereby control the temperature of the fuel cells, flowing a transition fuel into an anode loop of the fuel cell system, applying RCB to the fuel cells, and reducing the anodes by controlling the mass flow rate of the transition fuel and the magnitude of the RCB to maintain an anode fuel utilization in the range of 5% to 35%.

In accordance with some embodiments of the present disclosure, a method of transitioning a fuel cell system from a mode of operation wherein RCB is applied to the fuel cells at a hot standby temperature in the range of 800 C to 1000 C to a mode of operation wherein RCB is no longer applied to the fuel cells is provided. The method may comprise flowing an oxidant in a cathode loop of the fuel cell system, controlling the temperature of the oxidant flowing in the cathode loop to thereby control the temperature of the fuel cells, flowing a transition fuel into an anode loop of the fuel cell system, flowing a SOFC fuel into the anode loop of the fuel cell system at incrementally increasing mass flow rates until the mass flow rate is about 3% of a full load mass flow rate, applying an incrementally decreasing RCB to the fuel cell stack while incrementally increasing the mass flow rates of the SOFC fuel such that when the mass flow rate of SOFC fuel is about 3% of a full load mass flow rate the RCB is zero, and controlling an anode fuel utilization in the range of 35% to 90% controlling the magnitude of the RCB, and optionally the mass flow rate of the transition fuel and the mass flow rate of the SOFC fuel into the anode loop.

In accordance with some embodiments of the present disclosure a method of transitioning a fuel cell system having a stack comprising a plurality of fuel cells from a power-ready hot standby mode at a temperature in the range of 800 C to 1000 C wherein the anodes of the fuel cells are substantially free of oxidized metal, to a shutdown mode at ambient temperature wherein the anodes of the fuel cells comprise oxidized metal is provided. The method may comprise flowing an oxidant in a cathode loop of the fuel cell system, controlling the mass flow rate or the temperature of the oxidant flowing in the cathode loop to thereby effect cooling of the fuel cell stack, inhibiting oxidation of the metal in the anodes of the fuel cells while the fuel cell stack cools down from the hot standby temperature to a predetermined temperature by applying an RCB to the fuel cell stack while the fuel cell stack above the predetermined temperature and flowing a transition fuel in an anode loop of the fuel cell system at a mass flow rate sufficient to prevent oxidation of the metal in the anodes, and effecting oxidation of a metal contained in the anodes of the fuel cells while the fuel cell stack cools down from the predetermined temperature to ambient temperature by ceasing the flow of the transition fuel in the anode loop.

DETAILED DESCRIPTION

Figure 1:
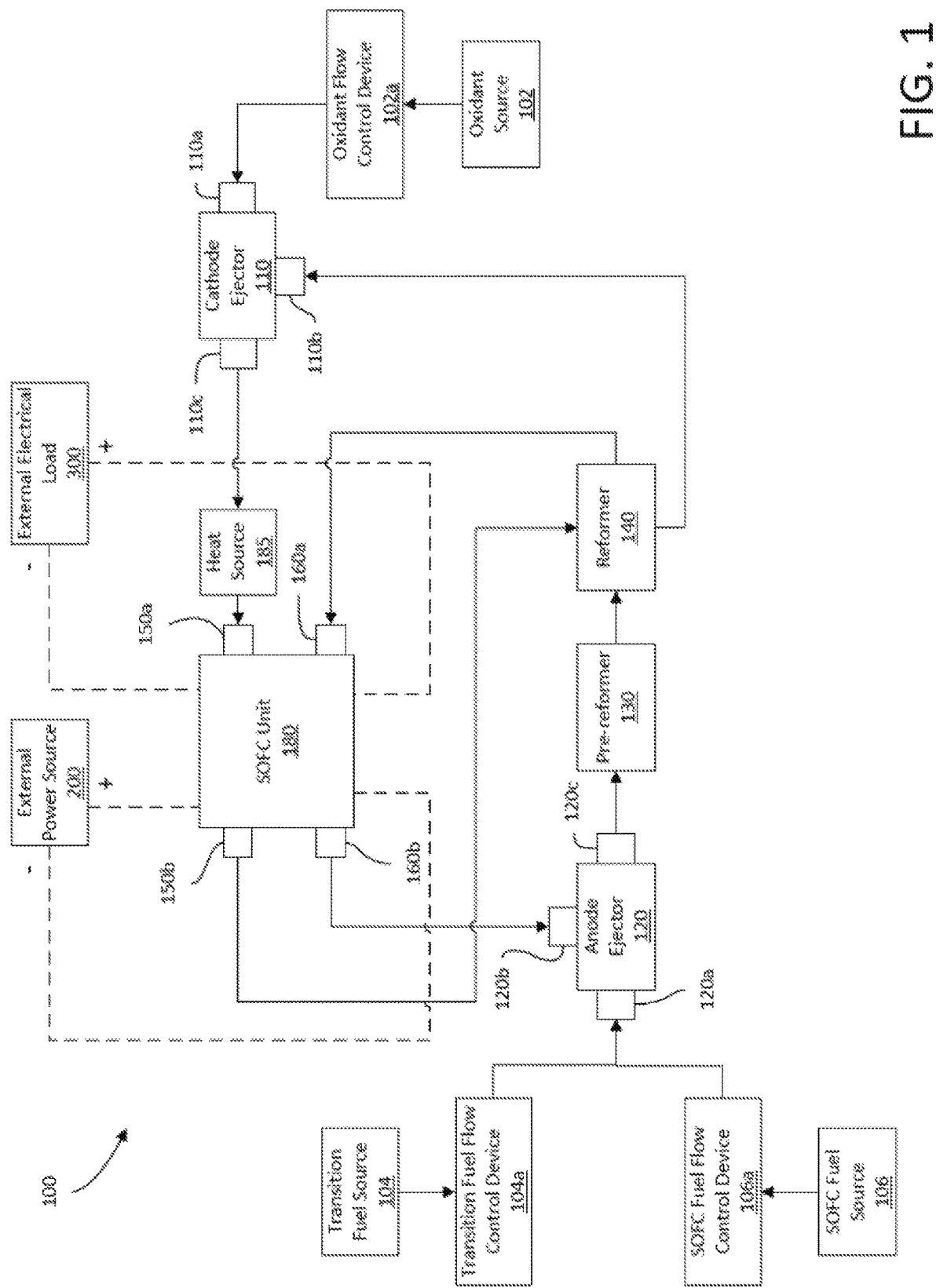
FIG. 1 is a block diagram of some components of one example embodiment of the solid oxide fuel cell (SOFC) system of the present disclosure.

While the features, methods, devices, and systems described herein may be embodied in various forms, the drawings show and the detailed description describes some exemplary and non-limiting embodiments. Not all of the components shown and described in the drawings and the detailed descriptions may be required, and some implementations may include additional, different, or fewer components from those expressly shown and described. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art.

For example, the systems and methods described herein are not limited to SOFC having Ni based anodes. Any fuel cell system having anodes that undergo a volume-changing oxidation may benefit from the methods described herein that form protective oxidation layers that mitigate the volumetric growth of anodes from oxidation.

Various embodiments of the present disclosure provide methods for transitioning a fuel cell system between modes of operation using varying amounts of a transition fuel and varying magnitudes of an applied reverse current bias to control anode oxidation and reduction in a manner that avoids the above-described fuel cell degradation mechanisms.

Figure 2:
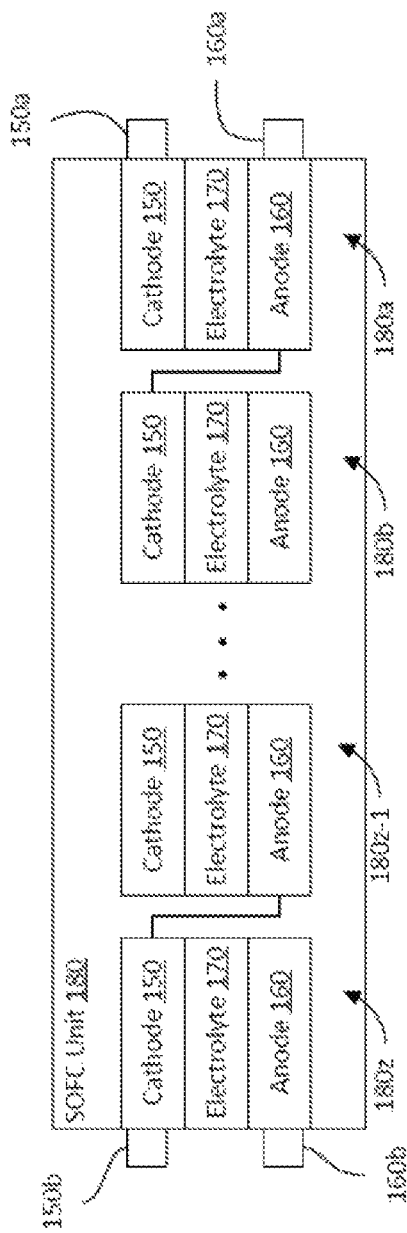
FIG. 2 is a block diagram of the SOFC unit of the fuel cell system of FIG. 1.
Figure 3:
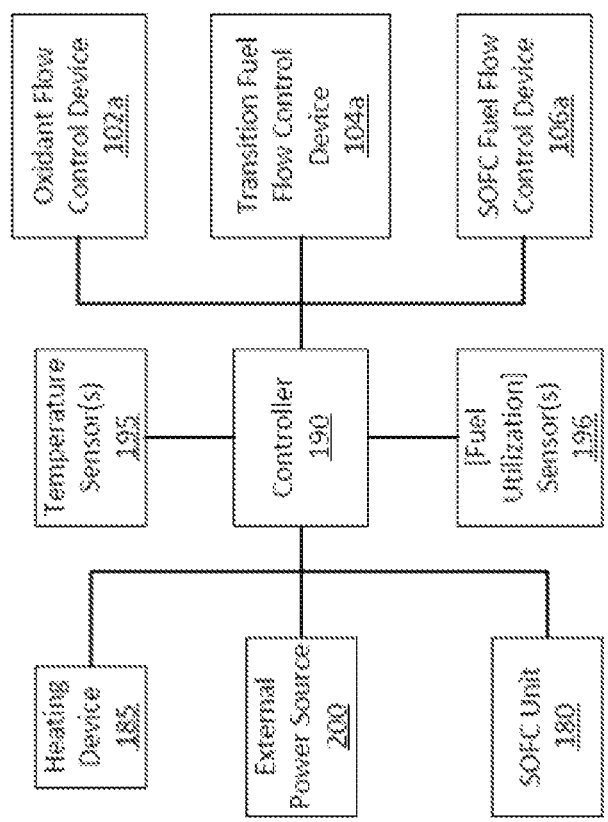
FIG. 3 is a block diagram of some components of the SOFC system of FIG. 1.

FIGS. 1-3 illustrate one example embodiment of a solid oxide fuel cell (SOFC) system 100 of the present disclosure and components thereof. While an SOFC system is described in the examples described herein, the present disclosure may be implemented in any other suitable fuel cell system. The SOFC system 100 includes an oxidant flow control device 102a, a transition fuel flow control device 104a, an SOFC fuel flow control device 106a, a cathode ejector 110, an anode ejector 120, a pre-reformer 130, a reformer 140, an SOFC unit 180 (also known as a "fuel cell stack"), a heat source 185, a controller 190, one or more temperature sensors 195, one or more fuel flow measurement, current, and/or voltage sensors that may function as fuel utilization sensor 196, and an external power source 200 (which may be any suitable power source such as a battery or an A/C or D/C power source). The SOFC system 100 is electrically connectable to an external electrical load 300 (which may be any suitable component) to provide electrical power to the electrical load.

As described in detail below, the SOFC system 100 is fluidly connectable to an oxidant source 102 (such as a source of air or any other suitable oxidant), a transition fuel source 104, and an SOFC fuel source 106. The transition fuel source 104 is a source of transition fuel, which is a reducing gas mixture including at least one reducible compound. The transition fuel may include, for instance, about 1% to about 5% hydrogen, about 70% to about 95% nitrogen, and about 1% to about 5% $H_2O$ (i.e., water). In various embodiments, the transition fuel is Protec 5 gas (a mixture of about 5% hydrogen and about 95% nitrogen). The SOFC fuel source 106 is a source of SOFC fuel (or other suitable operating fuel in non-SOFC embodiments), which may include hydrogen, hydrocarbons, carbon monoxide, water, or mixtures thereof.

1. Components

The oxidant flow control device 102a includes an oxidant inlet and an oxidant outlet (neither labeled) in fluid communication with one another. The oxidant inlet is fluidly connectable to the oxidant source 102 to enable the oxidant flow control device 102a to draw the oxidant from the oxidant source 102. The oxidant flow control device 102a is any suitable device configured to (directly or indirectly) control the mass flow rate of the oxidant into the SOFC system 100. The oxidant flow control device 102a may include, for instance, turbomachinery, a compressor, a metering valve, or any other suitable system or component(s), e.g., a critical flow orifice or a critical flow orifice in combination with an upstream pressure reducing valve.

The transition fuel flow control device 104a includes a transition fuel inlet and a transition fuel outlet (not labeled) in fluid communication with one another. The transition fuel inlet is fluidly connectable to the transition fuel source 104 to enable the transition fuel flow control device 104a to receive the transition fuel from the transition fuel source 104. The transition fuel flow control device 104a is any suitable device configured to (directly or indirectly) control the mass flow rate of the transition fuel into the SOFC system 100. The transition fuel flow control device 104a may include, for instance, turbomachinery, a compressor, a metering valve, or any other suitable system or component(s), e.g. a critical flow orifice, or a critical flow orifice in combination with an upstream pressure reducing valve.

The SOFC fuel flow control device 106a includes an SOFC fuel inlet and an SOFC fuel outlet (not labeled) in fluid communication with one another. The SOFC fuel inlet is fluidly connectable to the SOFC fuel source 106 to enable the SOFC fuel flow control device 106a to receive the SOFC fuel from the SOFC fuel source 106. The SOFC fuel flow control device 106a is any suitable device configured to (directly or indirectly) control the mass flow rate of the SOFC fuel into the SOFC system 100. The SOFC fuel flow control device 106a may include, for instance, turbomachinery, a compressor, a metering valve, or any other suitable system or component(s), e.g., a critical flow orifice, or a critical flow orifice in combination with an upstream pressure reducing valve.

The cathode ejector 110 includes a motive fluid inlet 110a (also known as an "oxidant supply input"), a suction fluid inlet 110b (also known as an "oxidant recycle input") and a fluid outlet 110c (also known as a "combined oxidant output") in fluid communication with one another. The cathode ejector 110 is configured (e.g., a convergent/divergent nozzle construction or any other suitable construction) such that when a relatively high-pressure motive fluid is introduced into the motive fluid inlet 110a and a relatively low-pressure suction fluid is present at the suction fluid inlet 110b, the flow of the motive fluid through the cathode ejector 110 creates a low pressure region (a vacuum in certain instances) downstream of the motive and suction fluid inlets 110a and 110b. This low-pressure region sucks the suction fluid from the suction fluid inlet 110b and causes the suction fluid to mix with the motive fluid before flowing out of the fluid outlet 110c.

The anode ejector 120 includes a motive fluid inlet 120a (also known as a "fuel supply input"), a suction fluid inlet 120b (also known as a "fuel recycle input"), and a fluid outlet 120c (also known as a "combined fuel output") in fluid communication with one another. The anode ejector 120 is configured (e.g., a convergent/divergent nozzle construction or any other suitable construction) such that when a relatively high-pressure motive fluid is introduced into the motive fluid inlet 120a and a relatively low-pressure suction fluid is present at the suction fluid inlet 120b, the flow of the motive fluid through the anode ejector 120 creates a low pressure region (a vacuum in certain instances) downstream of the motive and suction fluid inlets 120a and 120b. This low-pressure region sucks the suction fluid from the suction fluid inlet 120b and causes the suction fluid to mix with the motive fluid before flowing out of the fluid outlet 120c.

The pre-reformer 130 includes a fuel inlet and a fuel outlet (not labeled) in fluid communication with one another. The pre-reformer 130 is a suitable device (such as an adiabatic catalytic converter) configured to remove higher hydrocarbons from unreformed fuel, thereby converting the unreformed fuel into a pre-reformed fuel. In certain embodiments, the pre-reformer 130 is configured to do so with no heat input other than the heat present in the transition or SOFC fuel, and the suction-fluid. In some embodiments, the SOFC system does not include a pre-reformer.

The reformer 140 includes: (1) a cold side including a fuel inlet and a fuel outlet (not labeled) in fluid communication with one another; and (2) a hot side including an oxidant inlet and an oxidant outlet (not labeled) in fluid communication with one another. The reformer 140 is configured to transfer heat from the relatively hot oxidant that flows through the hot side from the oxidant inlet to the oxidant outlet to the relatively cold pre-reformed fuel traveling through the cold side from the fuel inlet to the fuel outlet. The reformer 140 is (partially) a counter-flow heat exchanger in this example embodiment, though the reformer may incorporate any other suitable type of heat exchanger in other embodiments. As the pre-reformed fuel flows from the fuel inlet to the fuel outlet, the reformer 140 is configured to reform the pre-reformed fuel via a catalyst into a reformed fuel. The heating of the pre-reformed fuel aids in the catalytic conversion process. In some embodiments, reformer 140 may function solely as a heat exchanger to warm the pre-reformed fuel therein. The reformation of the pre-reformed fuel may occur within the SOFC unit 180.

As best shown in FIG. 2, the SOFC unit 180 includes multiple individual SOFCs 180a, 180b, . . . 180z-1, and 180z (where z is any suitable number) each including an anode 160 including Ni and a cathode 150 sandwiching an electrolyte 170. The SOFCs are electrically connected to one another in series via interconnects (not labeled).

The SOFC unit 180 includes an anode inlet 160a (also known as a "fuel supply manifold") and an anode outlet 160b (also known as a "fuel exhaust manifold") in fluid communication with one another. Between the anode inlet 160a and anode outlet 160b may exist one or more fueling channels. Each anode is exposed to a fuel flowing in the one or more fueling channels. The anode inlet 160a, one or more fueling channels and anode outlet 160b may be known as the in-block fueling flowpath.

The SOFC unit 180 further includes a cathode inlet 150a (also known as a "an oxidant supply manifold") and a cathode outlet 150b (also known as a "oxidant exhaust manifold") in fluid communication with one another. Between the cathode inlet 150a and the cathode outlet 150b may exist one or more oxidizing channels. Each cathode may be exposed to an oxidant flowing in the one or more oxidizing channels. The cathode inlet 150a, one or more oxidizing channels, and the cathode outlet 150b may be referred to as the in-block oxidizing flowpath.

The SOFC unit 180 is electrically connectable to the external electrical load 300 to provide electrical power to the electrical load 300. The SOFC unit 180 is also electrically connectable to the power source 200 such that the power source 200 can apply a reverse current bias (RCB) to the SOFC unit 180. The applied RCB induces a reverse electrical current through the SOFC unit 180. Varying the magnitude of the applied RCB varies the magnitude of the induced reverse electrical current. In some embodiments, electrical load 300 and power source 200 may be one in the same, e.g., the power grid.

Generally, in operation, oxidant flows from the cathode inlet 150a to the cathode outlet 150b and past the cathodes 150, and SOFC fuel (sometimes combined with transition fuel) flows from the anode inlet 160a to the anode outlet 160b past the anodes 160. The cathodes 150 reduce the oxygen in the oxidant into oxygen ions that then diffuse through the electrolytes 170 to the anodes 160. The anodes 160 oxidize the fuel, which gives off electrons that flow through the electrical load 300.

The heat source 185 is any suitable device, such as a heat exchanger or a burner, configured to heat the oxidant flowing through the SOFC system 100.

The controller 190 includes a central processing unit (CPU) (not shown) communicatively connected to a memory (not shown). The CPU is configured to execute program code or instructions stored on the memory to control operation of various components of the SOFC system 100. The CPU may be a microprocessor; a content-addressable memory; a digital-signal processor; an application-specific integrated circuit; a field-programmable gate array; any suitable programmable logic device, discrete gate, or transistor logic; discrete hardware components; or any combination of these. The CPU may also be implemented as a combination of these devices, such as a combination of a digital signal processor and a microprocessor, a plurality of microprocessors, or one or more microprocessors in conjunction with a digital signal processor core.

The memory is configured to store, maintain, and provide data as needed to support the functionality of the SOFC system 100. For instance, in various embodiments, the memory stores program code or instructions executable by the CPU to control operation of the SOFC system 100. The memory includes any suitable data storage device or devices, such as volatile memory (e.g., random-access memory, dynamic random-access memory, or static random-access memory); non-volatile memory (e.g., read-only memory, mask read-only memory, programmable read-only memory, erasable programmable read-only memory, electrically erasable programmable read-only memory); and/or non-volatile random-access memory (e.g., flash memory, solid-state storage).

The temperature sensor(s) 195 is a thermocouple or other suitable type of temperature sensor configured to sense a temperature and to generate and send a signal representing the sensed temperature.

The fuel utilization sensor(s) 196 may be one or more of fuel flow measurement, current, and/or voltage sensor that may function as fuel utilization sensor 196. Fuel utilization sensor 196 may be configured to sense a current and to generate and send a signal representing the sensed current and, in combination with a fuel flow sensor configured to sense a fuel flow and to generate and send a signal representing the sensed fuel flow, determine the fuel utilization rate. Alternatively, using weak reducing gases of low $H_2$ content, the fuel utilization sensor 196 may be a voltage sensor configured to sense a voltage and to generate and send a signal representing the sensed voltage.

2. Connections

The oxidant inlet of the oxidant flow control device 102*a* is fluidly connectable to the oxidant source 102. The oxidant outlet of the oxidant flow control device 102*a* is in fluid communication with motive fluid inlet 110*a* of the cathode ejector 110.

The transition fuel inlet of the transition fuel flow control device 104*a* is fluidly connectable to the transition fuel source 104. The transition fuel outlet of the transition fuel flow control device 104*a* is in fluid communication with the motive fluid inlet 120*a* of the anode ejector 120.

The SOFC fuel inlet of the SOFC fuel flow control device 106*a* is fluidly connectable to the SOFC fuel source 106. The SOFC fuel outlet of the SOFC fuel flow control device 106*a* is in fluid communication with the motive fluid inlet 120*a* of the anode ejector 120.

The motive fluid inlet 110*a* of the cathode ejector 110 is in fluid communication with the oxidant outlet of the oxidant flow control device 102*a*. The oxidant flowpath upstream of the motive fluid inlet 110*a* may be referred to as the oxidant supply conduit. The suction fluid inlet 110*b* of the cathode ejector 110 is in fluid communication with the oxidant outlet of the reformer 140. The oxidant flowpath between the suction fluid inlet 110*b* of the cathode ejector 110 and the oxidant outlet of the reformer 140 may be referred as the oxidant recycle conduit. In some embodiments, the suction fluid inlet 110*b* may be in direct fluid communication with the cathode outlet 150*b*. The fluid outlet 110*c* of the cathode ejector 110 is in fluid communication with the cathode inlet 150*a* of the SOFC unit 180. The oxidant flowpath between the fluid outlet 110*c* of the cathode ejector 110 and the cathode inlet 150*a* of the SOFC unit 180 may be referred to as the combined oxidant supply conduit.

The motive fluid inlet 120*a* of the anode ejector 120 is in fluid communication with the transition fuel and the SOFC fuel outlets of the transition fuel and the SOFC fuel flow control devices 104*a* and 106*a*, respectively. The fuel flowpath(s) upstream of the motive fluid inlet 120*a* may be referred to as the fuel supply conduit. The suction fluid inlet 120*b* of the anode ejector 120 is in fluid communication with the anode outlet 160*b* of the SOFC unit 180. The fuel flowpath between the suction fluid inlet 120*b* of the anode ejector 120 and the anode outlet 160*b* of the SOFC unit 180 may be referred to as the fuel recycle conduit. The fluid outlet 120*c* of the anode ejector 120 is in fluid communication with the fuel inlet of the pre-reformer 130. The fuel flowpath(s) between the fluid outlet 120*c* and the anode inlet 160*a* may be referred to as the combined fuel supply conduit.

The fuel inlet of the pre-reformer 130 is in fluid communication with the fluid outlet 120*c* of the anode ejector 120. The fuel outlet of the pre-reformer 130 is in fluid communication with the fuel inlet of the reformer 140. In some embodiments, the pre-reformer 130 fuel outlet may be in fluid communication with both the reformer 140 and the anode inlet 160*a* such that a portion of the pre-reformed fuel may bypass the reformer 140 and be provided directly to the anode inlet 160*a*.

The fuel inlet of the reformer 140 is in fluid communication with the fuel outlet of the pre-reformer 130. The fuel outlet of the reformer 140 is in fluid communication with the anode inlet 160*a* of the SOFC unit 180. The oxidant inlet of the reformer 140 is in fluid communication with the cathode outlet 150*b* of the SOFC unit 180. The oxidant outlet of the reformer 140 is in fluid communication with the suction fluid inlet 110*b* of the cathode ejector 110. In some embodiments, the oxidant outlet of the reformer 140 may be in fluid communication with an auxiliary portion (not shown) of the SOFC system.

The cathode inlet 150*a* of the SOFC unit 180 is in fluid communication with the fluid outlet 110*c* of the cathode ejector 110. The cathode outlet 150*b* of the SOFC unit 180 is in fluid communication with the oxidant inlet of the reformer 140. In some embodiments the oxidant outlet 150*b* of the SOFC unit 180 may be in fluid communication with the suction fluid inlet 110*b* of the cathode ejector 110. The anode inlet 160*a* of the SOFC unit 180 is in fluid communication with the fuel outlet of the reformer 140. In some embodiments the anode inlet 160*a* of the SOFC unit 180 may be in fluid communication with the outlet of the pre-reformer 130. The anode outlet 160*b* of the SOFC unit 180 is in fluid communication with the suction fluid inlet 120*b* of the anode ejector 120. In some embodiments, the anode outlet 160*b* of the SOFC unit 180 may be in fluid communication with an auxiliary portion (not shown) of the SOFC system 100.

These fluid connections may be made in any suitable manner via flexible and/or rigid tubes, pipes, lines, and the like.

The heat source 185 is in thermal communication with the oxidant flowing in SOFC system 100. For instance, the heat source 185 may be in thermal communication with one or more fluid lines carrying the oxidant as it travels in the SOFC system 100. In some embodiments, heat source 185 may have one or more fuel inlets (not shown) for transition and/or SOFC fuel and a catalytic (or other) combustor to ignite the oxidant fuel mixture flowing in the oxidant flow paths.

The external power source 200 is electrically connectable to the SOFC unit 180 and configured to apply the RCB to the SOFC unit 180 to induce a reverse electrical current that flows from the cathodes 150 to the anodes 160 and eventually to ground.

The external electrical load 300 is electrically connectable to the SOFC unit 180 such that the SOFC unit 180 can provide electrical power to the electrical load 300 in the form of an electrical current that flows from the anode 160 to the cathode 150.

As shown in FIG. 3, the controller 190 is operatively connected to the oxidant flow control device 102*a* to operate the oxidant flow control device 102*a* that in turn controls the mass flow rate of oxidant into the SOFC system 100. The controller 190 is operatively connected to the transition fuel flow control device 104*a* to operate the transition fuel flow control device 104*a* that in turn controls the mass flow rate of transition fuel into the SOFC system 100. The controller 190 is operatively connected to the SOFC fuel flow control device 106*a* to operate the SOFC fuel flow control device 106*a* that in turn controls the mass flow rate of SOFC fuel into the SOFC system 100. The controller 190 is operatively connected to the heat source 185 to operate the heat source 185 that in turn heats oxidant. The controller 190 is operatively connected to the power source 200, which is electrically connectable to the SOFC unit 180, such that the controller 190 can control when the power source 200 applies the RCB to the SOFC unit 180 and can control the magnitude of the RCB. The controller 190 is operatively connected to the SOFC unit 180, which is electrically connectable to the electrical load 300, such that the controller 190 can control when the SOFC unit 180 provides electrical power to the electrical load 300 and can control the magnitude of the provided electrical power.

The controller 190 is communicatively connected to the temperature sensor(s) 195 and to the fuel utilization fuel flow, current and/or voltage sensor(s) 196 to receive the signals generated by those sensors.

3. Operation

The SOFC system 100 is operable in various modes described below, e.g., a hot standby mode, a power-ready hot standby mode, a normal operating mode, and a shutdown mode.

Shut-down mode as used herein refers to a state in which the SOFC system 100 is not operating and is at ambient temperature. In some embodiments, oxidant may be flowing through the cathode loop of said fuel cell system 100 at an ambient temperature. In some embodiments, no oxidant may be flowing through the cathode loop. No fuel (transition or SOFC) is flowing in the anode loop of SOFC system 100; therefore, no electrical power will be generated by the SOFC system 100 and no fuel is being utilized. No RCB is applied to the fuel cells of the SOFC unit 180.

When the SOFC system 100 is operating at a hot standby mode, the system 100 is at a hot standby temperature (which may be the operating temperature between about 800 degrees centigrade and 1000 degrees centigrade). The SOFC system 100 provides oxidant to the cathode side of the SOFC unit 180 but does not provide SOFC fuel or transition fuel to the anode side of the SOFC unit 180. Consequently, no electrical power is generated by the SOFC unit 180. Oxidant is supplied to the SOFC system 100 to maintain the SOFC unit 180 at the operating temperature in combination with the heat source 185. Heat source 185 is required because there is no heat generation from the heat produced from the power generation.

When the SOFC system 100 is operating in a power-ready hot standby mode, the anodes of SOFC unit 180 are in a reduced state. To avoid anode oxidation that would occur if oxygen was allowed to accumulate at the anodes at the operating temperature, a RCB is being applied to the fuel cells of SOFC unit 180 and a transition gas is being supplied to the anodes of the SOFC unit 180 at a relatively high mass flow rate. As described below, supplying the transition gas creates a surplus of hydrogen at the anodes to consume the oxygen, prevent rapid anode oxidation, and stimulate anode reduction if any fuel cell anode is in an oxidized state. SOFC fuel is supplied to the anodes of the SOFC unit 180 at a rate of about 3% of the full-load design SOFC fuel mass flow rate. Anode fuel utilization is maintained at about 80%. Oxidant is supplied to the SOFC unit 180 at a rate of about 50% of design load mass flow rate. Heat source 185 is operational and maintaining the SOFC unit at an operating temperature.

When the SOFC system 100 is in normal operating mode, the SOFC unit 180 is at an operating temperature, which is between about 800 degrees centigrade and 1000 degrees centigrade, and the SOFC system 100 provides the oxidant to the cathode side of the SOFC unit 180 and SOFC fuel to the anode side of the SOFC unit 180. The ensuing reactions generate electricity that is provided to the electrical load 300.

Described below are methods for transitioning the SOFC system 100 from shut-down mode to hot standby mode, from hot standby mode to a power ready host standby mode, from power ready hot standby mode to a (normal) operating mode back, from a normal operating mode to both a shut-down mode and a power ready hot standby mode, and from power ready hot standby mode to a shut-down mode. Each of these methods is performed with at least the objectives of (1) preventing the over-oxidation of the anodes and thus preventing the above mentioned anode degradation mechanisms while (2) minimizing dependence on the transition fuel by monitoring fuel utilization.

In each applicable mode of operation, oxidant generally flows through the SOFC system 100 as follows. The controller 190 is configured to control the oxidant flow control device 102*a* to control the flow of the oxidant into the SOFC system 100 at a particular oxidant mass flow rate. The oxidant flow control device 102*a* is configured to draw the oxidant from the oxidant source 102 and force the oxidant through a cathode loop of the SOFC system 100, that is: into the cathode ejector 110, from the cathode ejector 110 into the SOFC unit 180, from the SOFC unit 180 to the reformer 140, and from the reformer 140 back to the cathode ejector 110. In some embodiments, oxidant may flow from the SOFC unit 180 to the cathode ejector 110 without passing through the reformer 140. In some embodiments, a portion of the oxidant is exhausted to the atmosphere, provided to an auxiliary loop (not shown), or both after flowing through the reformer 140.

More specifically, the controller 190 is configured to control the oxidant flow control device 102*a* to draw the oxidant from the oxidant source 102 and provide the oxidant to the motive fluid inlet 110*a* of the cathode ejector 110 (i.e., to provide the oxidant into the cathode loop). The oxidant flows through the cathode ejector 110, mixes with cathode exhaust received at the suction fluid inlet 110b, and flows out of the fluid outlet 110c to the cathode inlet 150a of the SOFC unit 180. The oxidant flows from the cathode inlet 150a of the SOFC unit 180 to the cathode outlet 150b of the SOFC unit 180. Between the cathode inlet 150a and cathode outlet 150b, oxidant flows over the cathodes of the various fuel cells in SOFC unit 180. The controller 190 may control the heat source 185 to heat the oxidant as it flows through the cathode side of the SOFC unit 180. In turn, this heated oxidant will transfer heat into the SOFC unit 180, thereby raising the temperature of the entire unit 180. The oxidant exits the cathode outlet 150b of the SOFC unit as cathode exhaust, which flows into the oxidant inlet of the reformer 140. The cathode exhaust flows through the reformer 140, exits the oxidant outlet of the reformer 140, and flows to the suction fluid inlet 110b of the cathode ejector 110 where is it directed back into the cathode inlet 150a of the SOFC unit 180.

Generally, the transition fuel flows through the SOFC system 100 as follows. The controller 190 is configured to control the transition fuel flow control device 104a to control the flow of the transition fuel into the SOFC system 100 at a particular transition fuel mass flow rate. The transition fuel flow control device 104a is configured to receive the transition fuel from the transition fuel source 104 and force the transition fuel through an anode loop of the SOFC system 100, that is: into the anode ejector 120, from the anode ejector 120 into the pre-reformer 130, from the pre-reformer 130 into the reformer 140, from the reformer 140 into the SOFC unit 180, and from the SOFC unit 180 back into the anode ejector 120. In some embodiments, as described above, some of the fuel exiting the pre-reformer 130 may flow around reformer 140 and be supplied to directly to the SOFC unit 180, such that some of the fuel may be unreformed when entering the SOFC unit 180. In some embodiments, as described above, the reformer 140 may function only as a heat exchanger.

More specifically, the controller 190 is configured to control the transition fuel flow control device 104a to receive the transition fuel from the transition fuel source 104 and provide the transition fuel to the motive fluid inlet 120a of the anode ejector 120 (i.e., to provide the transition fuel into the anode loop). The transition fuel flows through the anode ejector 120, mixes with anode exhaust received at the suction fluid inlet 120b, and flows out of the fluid outlet 120c to the fuel inlet of the pre-reformer 130. The transition fuel flows through the pre-reformer 130, exits the fuel outlet of the pre-reformer 130, and flows into the fuel inlet of the reformer 140. The transition fuel flows through the reformer 140, exits the fuel outlet of the reformer 140, and flows into the anode inlet 160a of the SOFC unit 180. The transition fuel flows from the anode inlet 160a of the SOFC unit 180 to the anode outlet 160b of the SOFC unit 180. Between the anode inlet 160a and anode outlet 160b, the transition fuel passes by the anodes of the fuel cells in the SOFC unit 180. The transition fuel exits the anode outlet 160b of the SOFC unit 180 as anode exhaust, which flows into the suction fluid inlet 120b of the anode ejector 120 where it is directed back into the pre-reformer 130. In some embodiments, a portion of the anode exhaust may be provided to an auxiliary loop (not shown), exhausted to the atmosphere, or both rather than continuing to flow within the anode loop.

Generally, the SOFC fuel flows through the SOFC system 100 as follows. The controller 190 is configured to control the SOFC fuel flow control device 106a to control the flow of the SOFC fuel into the SOFC system 100 at a particular SOFC fuel mass flow rate. The SOFC fuel flow control device 106a is configured to receive the SOFC fuel from the SOFC fuel source 106 and force the SOFC fuel through the anode loop of the SOFC system 100. In some embodiments, alternative flow paths for the SOFC fuel are provided; these alterative paths may be similar to those described above for the transition fuel.

More specifically, the controller 190 is configured to control the SOFC fuel flow control device 106a to receive the SOFC fuel from the SOFC fuel source 106 and provide the SOFC fuel to the motive fluid inlet 120a of the anode ejector 120 (i.e., to provide the SOFC fuel into the anode loop). The SOFC fuel flows through the anode ejector 120, mixes with anode exhaust received at the suction fluid inlet 120b, and flows out of the fluid outlet 120c to the fuel inlet of the pre-reformer 130. The SOFC fuel flows through the pre-reformer 130, exits the fuel outlet of the pre-reformer 130, and flows into the fuel inlet of the reformer 140. The SOFC fuel flows through the reformer 140, exits the fuel outlet of the reformer 140, and flows into the anode inlet 160a of the SOFC unit 180. The SOFC fuel flows from the anode inlet 160a of the SOFC unit 180 to the anode outlet 160b of the SOFC unit 180. Between the anode inlet 160a and the anode outlet 160b, the SOFC fuel is provided to the anodes of the fuel cells in SOFC unit 180. The SOFC fuel exits the anode outlet 160b of the SOFC unit as anode exhaust, which flows into the suction fluid inlet 120b of the anode ejector 120 where it is directed back into the pre-reformer 130. In some embodiments, alternative flow paths for the SOFC fuel may be provided, such as those flow paths described above for the transition fuel. In some embodiments, the reformer 140 may function only as a heat exchanger.

While the SOFC system 100 is in operation, the controller 190 is configured to periodically determine a representative temperature of the SOFC unit 180 based on the temperatures sensed by the temperature sensor(s) 195. As used below, the "SOFC unit temperature" refers to a representative temperature of the SOFC unit 180. As described below, the controller 190 is configured to monitor the SOFC unit temperature to determine when to take certain actions when transitioning the SOFC system 100 between different modes of operation.

As used below, "full load" means the design capacity of the SOFC to generate power.

While the SOFC system 100 is in operation, the controller 190 is configured to periodically determine the fuel utilization of the SOFC system 100 based on the fuel flow, current and/or voltage sensed by the fuel utilization sensor(s) 196. As used below, "fuel utilization" refers to the ratio of fuel consumed to the total fuel fed into the anode ejector of the SOFC unit 180, as shown in Equation (1) below. Fuel refers to SOFC fuel, transition fuel, or a mixture thereof, depending on the situation. As described below, the controller 190 is configured to monitor the fuel utilization to determine when to take certain actions when transitioning the SOFC system 100 between different modes of operation.

$$\text{Fuel Utilization} = \frac{\text{Fuel Consumed by the fuel cell (~current)}}{\text{Fuel Fed into Anode Ejector of the } SOFC \text{ Unit}} \quad (1)$$

Fuel utilization can also be calculated from measured fuel concentrations entering and leaving the SOFC unit 180.

When transition fuel is fed to the SOFC unit 180 in combination with RCB, it is more accurate to relate fuel utilization to measured voltages via the relationship between Nernst potential and $H_2$ concentration at the prevailing operating temperature and pressure. Nernst potential provides a good approximation of the measured voltage under the SOFC conditions that use lean a transition fuel in combination with RCB. Using net current and total fuel feed is subject to significant error under these conditions.

Figure 4:
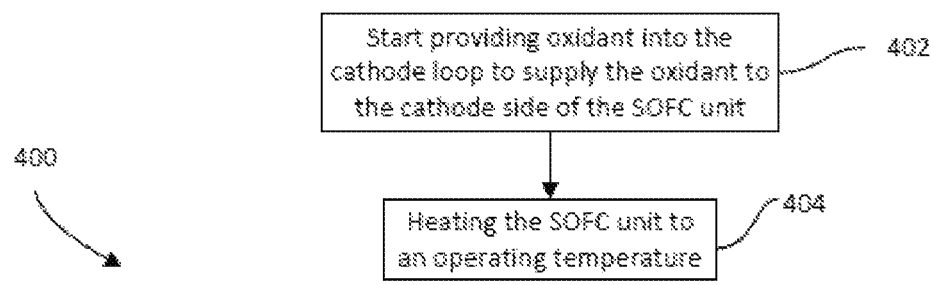
FIGS. 4 and 4A are flowcharts illustrating two methods of operating the SOFC system of FIG. 1 to transition from shut-down mode to a hot standby mode.

In some embodiments, the SOFC system 100 and/or controller 190 is configured to control the fuel utilization by controlling the magnitude of the RCB, mass flow rate of the transition and/or SOFC fuel, or both. In some embodiments, the SOFC system 100 and/or controller 190 is configured to control the fuel utilization by controlling the mass flow rate of the transition and/or SOFC fuel being supplied to the anode ejector 120 from the transitions and/or SOFC fuel source 104/106, the mass flow rate of the fuel exhausted by SOFC unit 180 being supplied to anode ejector 120, or both. In some embodiments, the SOFC system 100 and/or controller 190 us configured to control the mass flow rate of transition fuel into the anode loop to maintain a positive mass flow rate of fuel exhaust in the fuel recycle conduit roughly equal in magnitude to the mass flow rate of transition fuel feeding the ejector 3.1 Transitioning from Shut-Down Mode to Hot Standby Mode FIG. 4 is a flowchart illustrating a method 400 of operating the SOFC system 100 to transition the SOFC system 100 from shut-down mode to hot standby mode. In various embodiments, instructions stored in the memory of the controller 190 and executed by the CPU of the controller 190 represent the method 400. Although the method 400 is described with respect to the flowchart shown in FIG. 4, other methods of performing the acts described below may be employed. In certain embodiments, the blocks are performed in the order in which they are shown, while in other embodiments the blocks are performed in different orders.

The method 400 starts responsive to the controller 190 receiving an input (such as from an operator via an input device) including an instruction to begin transitioning the SOFC system 100 from shut-down mode to hot standby mode. In response, the SOFC system 100 starts providing oxidant to the cathode loop of the SOFC system 100 to supply oxidant to the cathode side of the SOFC unit 180, as block 402 indicates. For instance, the controller 190 controls the oxidant flow control device 102*a* to draw the oxidant from the oxidant source 102 and provide the oxidant to the cathode loop of the SOFC system 100 (as described above) at a certain oxidant mass flow rate. In some embodiments, the oxidant mass flow rate is greater than 50% of the oxidant mass flow rate at full load. In some embodiments, the oxidant mass flow rate is greater than 75% of the oxidant mass flow rate at full load. In some embodiments, the oxidant mass flow rate is between 65% and 100% of the oxidant mass flow rate at full load. In some embodiments, the oxidant mass flow rate is between 50% and 100% of the oxidant mass flow rate at full load. In some embodiments, the oxidant mass flow rate is equal to the oxidant mass flow rate at full load.

The SOFC system 100 heats the SOFC unit 180 until the SOFC unit temperature reaches a hot standby temperature, as block 404 indicates. For instance, the controller 190 controls the heat source 185 to heat the oxidant upstream of the SOFC unit 180, which in turn heats the SOFC unit 180 as the oxidant flows through the cathode side of the SOFC unit 180. In this example embodiment, the hot standby temperature is between about 800 degrees centigrade and about 1000 degrees centigrade. In other embodiments, the hot standby temperature is between about 800 degrees centigrade and about 900 degrees centigrade. In further embodiments, the hot standby temperature is about 850 degrees centigrade. Once the SOFC unit 180 reaches its hot standby temperature, controller 190 controls the heat source 185, oxidant flow control device 102*a*, or both to maintain the SOFC unit 180 at its hot standby temperature. When the SOFC unit 180 reaches the hot standby temperature, it is now in a hot standby mode.

In some embodiments, the SOFC system controls the heatup of the SOFC unit 180 from the ambient temperature to the hot standby temperature at a rate of about 1 C to 5 C per minute. In some embodiments, the SOFC system controls the heatup of the SOFC unit 180 from the ambient temperature to the hot standby temperature at a rate of about 3 C per minute During heat up of SOFC unit 180 from ambient to hot standby temperature no transition fuel or SOFC fuel is supplied to the anode loop. Consequently, the anodes of the SOFC unit 180 may be oxidized. If the anodes of the SOFC unit 180 have been previously oxidized at an intermediate temperature as described above and below, the protective NiO shell formed during the previous cool down mitigates or prevents further oxidation of the Ni anodes.

Figure 4A:
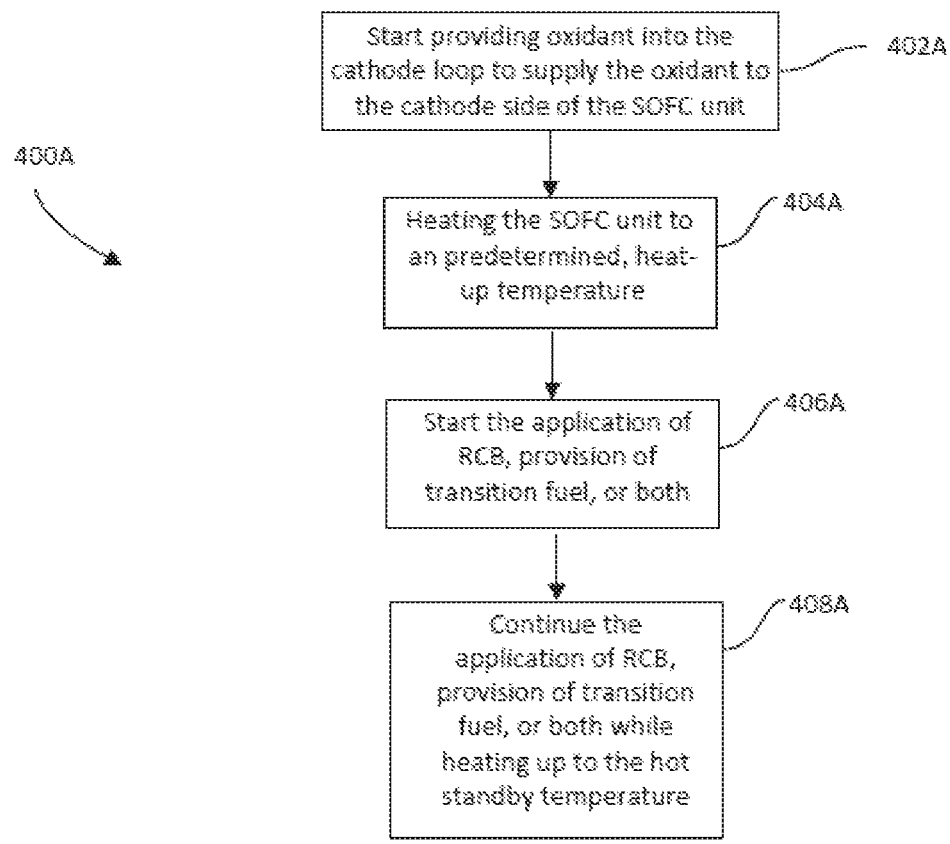

In some embodiments, a method 400A of operating the SOFC system 100 to transition the SOFC system 100 from shut-down mode to hot standby mode includes the provision of transition fuel and/or applying an RCB beginning at a predetermined, heat-up temperature. Method 400A is illustrated in FIG. 4A. The method 400A may comprise the same steps and parameters as described above for method 400 as modified below.

The method 400A may be utilized to provide for the formation of a protective oxide layer on the Ni particles of reduced anodes 160 if a protective layer had not been previously formed. Method 400A may being responsive to receiving an input that start providing oxidant to the cathode loop as shown in block 402A and as described above. The heating source 185 may be operated to raise the temperature SOFC unit 180 as described above until the SOFC unit 180 reaches a predetermined, heat-up temperature as shown in block 404A. Once the SOFC unit 180 has been heated to the predetermined heat-up temperature, either one or both of the application of RCB or the provision of transition fuel may be provided to the SOFC unit 180, as shown in block 406A, in order to prevent the oxidation, or further oxidation, of the anodes 160 of the SOFC unit 180. The application of RCB, provision of transition fuel, or both is maintained while the SOFC unit 180 heat-up continues from the predetermined heat-up temperature to the hot standby temperature as indicated by block 408A.

In some embodiments, one or both of the application of RCB or the provision of transition fuel may occur prior the SOFC unit 180 reaching the predetermined heat-up temperature. For example, in some embodiments the application of RCB may occur prior to the predetermined heat-up temperature in order to drive the reverse reaction that drives oxygen back to the cathode side of the SOFC unit 180, thereby presenting the anodes 160 with lower concentrations of oxidant. After the predetermined heat-up temperature is reached, the transition fuel may be provided to scavenge free oxygen.

The predetermined temperature may be determined by the system operator. In some embodiments, the predetermined heat-up temperature may be selected as about 300 to 400 degrees centigrade. When selected at this temperature, the method 400A functions to prevent any significant oxidation of the anodes during heat-up. This may be particularly useful when, e.g., the anodes are in a completely reduced state upon startup. While selecting this predetermined heat-up temperature range may use more transition fuel than a higher predetermined temperature, this method will use less transition fuel than other methods that provide a transition fuel to the SOFC unit 180 at all times during heat-up.

In some embodiments, the predetermined heat-up temperature is between about 450 degrees centigrade and about 750 degrees centigrade. In some embodiments, the predetermined heat-up temperature is between about 550 degrees centigrade and about 750 degrees centigrade. In some embodiments, the predetermined heat-up temperature is between about 600 degrees centigrade and about 650 degrees centigrade. In some embodiments, the predetermined heat-up temperature is about 650 degrees centigrade. Such embodiments allow for the formation of a protective oxide layer on the Ni particles of anode 160 to protect the anode from subsequent, severe oxidation that may occur at higher temperatures. Additionally, less transition fuel may be used because the transition fuel is not provided until the SOFC unit 180 is at a temperature that is much closer to the hot standby temperature.

SOFC system 100 starts providing transition fuel into the anode loop of the SOFC system 100 to supply transition fuel to the anode side of the SOFC unit 180, as block 406A indicates. For instance, the controller 190 controls the transition fuel flow control device 104a to receive the transition fuel from the transition fuel source 104 and provide the transition fuel into the anode loop of the SOFC system 100 (as described above) at a transition fuel mass flow rate. In some embodiments, the system 100 will utilize a relatively lower transition gas flow rate to conserve the transition gas. In some embodiments, the anode reduction will utilize a higher transition gas flow rate.

The SOFC system 100 may control the transition fuel mass flow rate and/or the magnitude of the RCB to maintain a fuel utilization to within an anode-protection fuel utilization range. For instance, the controller 190 controls the transition fuel flow control device 104a to control the transition fuel mass flow rate and/or controls the power source 200 to control the magnitude of the RCB to increase the fuel utilization to within the anode-protection fuel utilization range. In this some embodiments, the anode-protection mode fuel utilization range is about 35% to about 65%. In some embodiments, the anode-protection mode fuel utilization range is about 40% to about 60%. In some embodiments, the anode-protection fuel utilization range is 50%.

In some embodiments, maintaining the fuel utilization with the anode-protection fuel utilization range may provide for the reduction of the any oxidized anode as the SOFC unit 180 is heated from the predetermined heat-up temperature to the hot standby temperature. Depending on the type and amount of anode oxidation, this may allow for the complete reduction of the anodes before the SOFC unit 180 reaches the hot standby temperature. In such an embodiment, no separate reduction of the anode need be performed after the SOFC unit 180 as reached the hot standby temperature.

In some embodiments, the fuel utilization may be in an anode-reduction fuel utilization range during the heatup from the predetermined heat-up temperature to the hot standby temperature. Depending on the type and amount of anode oxidation, this may allow for the complete reduction of the anodes before the SOFC unit 180 reaches the hot standby temperature. In such an embodiment, no separate reduction of the anode need be performed after the SOFC unit 180 as reached the hot standby temperature. In some embodiments, the anode-reduction fuel utilization range is about 5% to about 15%. In some embodiments, the anode-reduction fuel utilization range is about 5% to about 35%. In some embodiments, the anode-reduction fuel utilization is about 10%. In some embodiments, the anode-reduction fuel utilization is about 20%.

In some embodiments, the oxidant mass flow rate is greater than 50% of the oxidant mass flow rate at full load. In some embodiments, the oxidant mass flow rate is greater than 75% of the oxidant mass flow rate at full load. In some embodiments, the oxidant mass flow rate is between 65% and 100% of the oxidant mass flow rate at full load. In some embodiments, the oxidant mass flow rate is between 50% and 100% of the oxidant mass flow rate at full load. In some embodiments, the oxidant mass flow rate is equal to the oxidant mass flow rate at full load.

3.2 Transitioning from Hot Standby Mode to Power-Ready Hot Standby Mode

Figure 5:
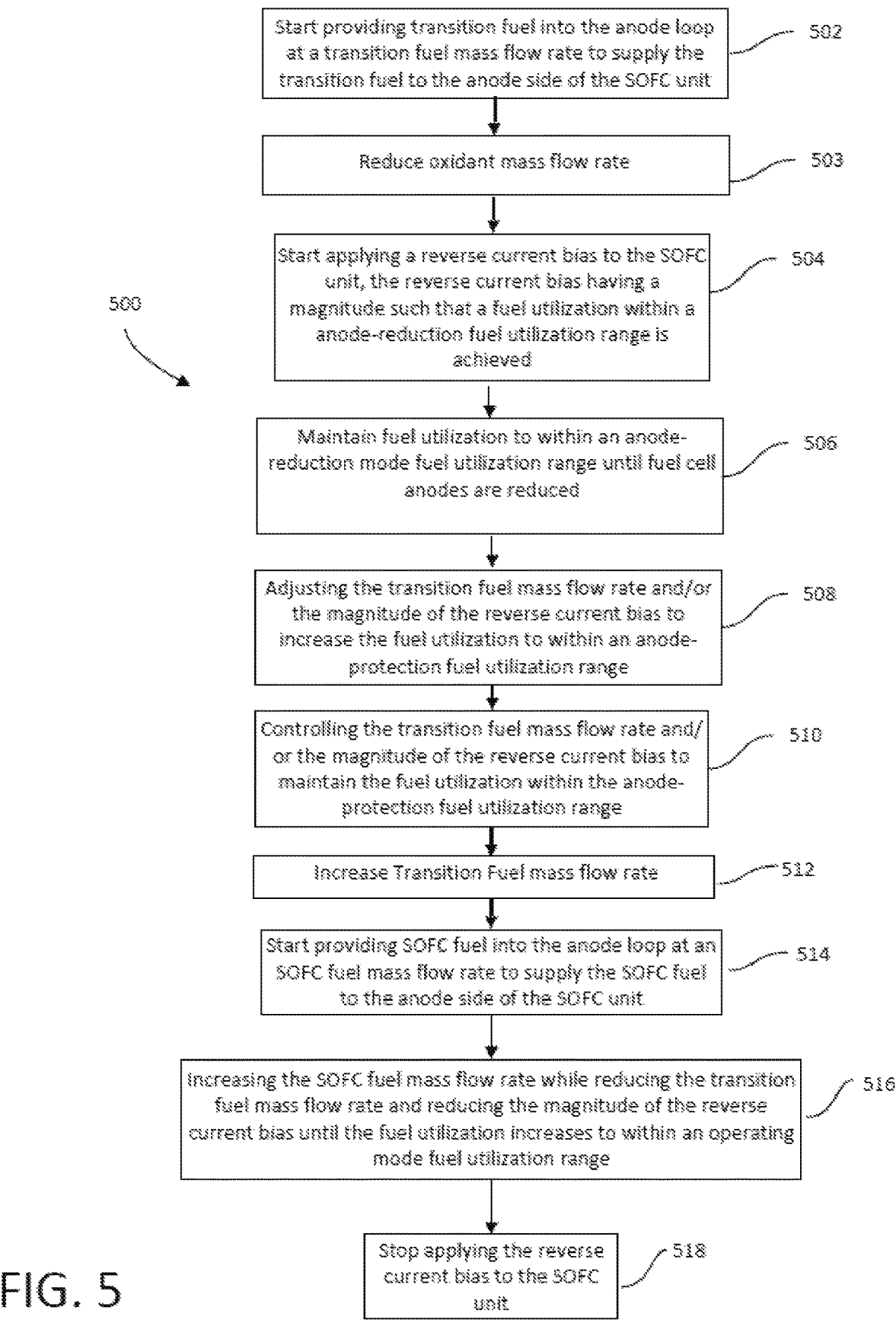
FIG. 5 is a flowchart illustrating a method of operating the SOFC system of FIG. 1 to transition from hot standby mode to power-ready hot standby operating mode.

FIG. 5 is a flowchart illustrating a method 500 of operating the SOFC system 100 to transition the SOFC system 100 from hot standby mode to power-ready hot standby mode. In various embodiments, instructions stored in the memory of the controller 190 and executed by the CPU of the controller 190 represent the method 500. Although the method 500 is described with respect to the flowchart shown in FIG. 5, other methods of performing the acts described below may be employed. In certain embodiments, the blocks are performed in the order in which they are shown; while in other embodiments the blocks are performed in different orders. The method 500 starts responsive to the controller 190 receiving an input (such as from an operator via an input device) including an instruction to begin transitioning the SOFC system 100 from hot standby mode to a power-ready hot standby mode.

After the SOFC unit temperature reaches the hot standby temperature, the fuel cell anode may have to be reduced to restore the reactivity and conductivity of the anodes before the SOFC system 100 starts producing electrical power. For this purpose, the SOFC system 100 starts providing transition fuel into the anode loop of the SOFC system 100 to supply transition fuel to the anode side of the SOFC unit 180, as block 502 indicates. For instance, the controller 190 controls the transition fuel flow control device 104a to receive the transition fuel from the transition fuel source 104 and provide the transition fuel into the anode loop of the SOFC system 100 (as described above) at a transition fuel mass flow rate. In some embodiments, the anode reduction will utilize a lower transition gas flow rate to conserve the transition gas. In some embodiments, the anode reduction will utilize a higher transition gas flow rate. Whether a higher or lower flow rate of the transition gas is used during the anode reduction may be determined, at least in part, by the operating modes following the anode reduction. For instance, a lower flow rate may be used to conserve gas and provide a better setup for a protection mode that may be entered into prior to and during cool down from a high (e.g., operating) temperature. A higher flow rate may be used if the fuel system mode will more quickly transition to a loading and subsequent normal operational modes.

The mass flow rate of the oxidant during fuel cell anode reduction is maintained but lowered to approximately 50%, as indicated by block 503. In some embodiments, the mass flow rate of the oxidant during fuel cell anode reduction is maintained in a range of 40 to 60%. The lower amount of oxidant reaching the anodes reduces the system pressure which increases anode recycle rates for a given transition gas mass flow. Therefore, the minimum amount of transition gas required to ensure adequate anode recycle is less.

Adequate anode recycle (i.e. positive recycle flow) is important for ensuring adequate mass flow and adequate flow distribution over the entire fuel cell surface. The flow of oxidant must be maintained such that the temperature of the SOFC unit 180 can be maintained at the hot standby temperature by controlling the temperature and mass flow rate of the oxidant.

The SOFC system 100 starts applying an RCB to the SOFC unit 180, as block 504 indicates. The RCB has a magnitude such that the fuel utilization at this point is within an anode-reduction fuel utilization range that is more conducive to reducing the fuel cell anode. For instance, the controller 190 controls the power source 200 to apply the RCB to the SOFC unit 180 at a magnitude such that the fuel utilization is within the anode-reduction fuel utilization range. In some embodiments, the anode-reduction fuel utilization range is about 5% to about 15%. In some embodiments, the anode-reduction fuel utilization range is about 5% to about 35%. In some embodiments, the anode-reduction fuel utilization is about 10%. In some embodiments, the anode-reduction fuel utilization is about 20%. After starting to provide the transition fuel into the anode loop of the SOFC system 100 and after starting to apply the RCB to the SOFC unit 180, the SOFC system 100 controls the transition fuel mass flow rate and/or the magnitude of the RCB to maintain the fuel utilization to within or near the anode-reduction mode fuel utilization range until the anodes of SOFC unit 180 have been reduced, as block 506 indicates. In some embodiments, the mass flow rate of the fuel in the fuel recycle conduit is alone controlled to control the fuel utilization or in combination with the transition fuel mass flow rate and/or the RCB.

After the anodes have been reduced, the SOFC system 100 controls the transition fuel mass flow rate and/or the magnitude of the RCB to increase the fuel utilization to within an anode-protection fuel utilization range, as block 508 indicates. For instance, the controller 190 controls the transition fuel flow control device 104a to control the transition fuel mass flow rate and/or controls the power source 200 to control the magnitude of the RCB to increase the fuel utilization to within the anode-protection fuel utilization range. In this some embodiments, the anode-protection mode fuel utilization range is about 35% to about 65%. In some embodiments, the anode-protection mode fuel utilization range is about 40% to about 60%. In some embodiments, the anode-protection mode fuel utilization range is 50%.

In order to decrease the required anode reduction time, the fuel utilization (within the anode-protection fuel utilization range), the transition fuel mass flow rate, and the magnitude of the RCB are set so as to stimulate anode reduction (i.e., the reduction of NiO into Ni). Anode oxidation occurs when there is insufficient $H_2$ at the anode to consume (or scavenge) the $O_2$ flowing from the cathode. The application of the RCB generates $H_2$ from $H_2O$ and forces $O_2$ back to the cathode. Increasing the RCB yields a relatively low fuel utilization (e.g., less than 50%) and results in a surplus of $H_2$ at the anode by favoring the reverse reaction, and which stimulates anode reduction.

At this point, the anodes of the SOFC unit 180 have been reduced, and the SOFC system 100 controls the transition fuel mass flow rate and/or the magnitude of the RCB to maintain the fuel utilization within the anode-protection fuel utilization range, as block 510 indicates until the SOFC unit 180 transitions to either power-ready hot standby mode or shut-down mode. For instance, the controller 190 controls the transition fuel flow control device 104a (to control the transition fuel mass flow rate) and/or controls the power source 200 (to control the magnitude of the RCB) to maintain the fuel utilization within the anode-protection fuel utilization range.

When transitioning to power-ready hot standby, the transition fuel mass flow rate is increased above that required for anode reduction and protection, as indicated by block 512. A higher transition fuel flow rate is required to manage fuel cell temperatures within the required range as the SOFC fuel mass flow rate is increased incrementally to the low end of the normal operating range of the fuel cell. Additionally, the transition fuel flow rate must be increased to sustain a high anode recycle rate that is necessary to maintain an adequate steam to carbon required to reform the SOFC fuel without forming of carbon.

With the transition gas being supplied to the SOFC unit 180 at a higher mass flowrate, the SOFC system 100 starts providing SOFC fuel into the anode loop of the SOFC system 100 to supply SOFC fuel to the anode side of the SOFC unit 180, as block 514 indicates. For instance, the controller 190 controls the SOFC fuel flow control device 106a to receive the SOFC fuel from the SOFC fuel source 106 and provide the SOFC fuel into the anode loop of the SOFC system 100 (as described above) at an SOFC fuel mass flow rate. At this point, the SOFC system 100 provides both SOFC fuel and transition fuel into the anode loop of the SOFC system 100. The initial SOFC fuel mass flow rate is sufficiently small so that sufficient $H_2O$, produced from the reaction of $H_2$ in the transition fuel and $O_2$ present at the anodes, is present to reform the added SOFC fuel. If the initial SOFC fuel mass flow rate is too high, there is a risk of carbon formation due to insufficient steam available to reform the fuel.

The SOFC system 100 will incrementally increase the SOFC fuel mass flow rate and reduced the RCB. The RCB is reduced, thereby resulting in less of the generated steam reacting via the reverse reaction to $H_2$. However, if RCB is incrementally reduced too much all the hydrogen is consumed, thereby subjecting the anode to oxidation. The additional steam generation is able to support higher mass flow rates of the SOFC fuel. Taken together, the incremental steps in SOFC fuel mas flow rate increases and RCB reduction must be small with sufficient time between steps to maintain and excess of steam and hydrogen at all times over the entire fuel cell surface. Time is required to reach a new, safe steady state conditions after each incremental steps before the next incremental step is take. This time required is only on the order of 1 minute, but will vary depending on the particular fuel cell system.

The SOFC system 100 will continue the incremental increases the SOFC fuel mass flow rate while reducing the transition fuel mass flow rate and while reducing the magnitude of the RCB until the fuel utilization increases to within an operating mode fuel utilization range, as block 516 indicates. For instance, the controller 190 controls the SOFC fuel flow control device 106a to increase the SOFC fuel mass flow rate while controlling the transition fuel flow control device 104a to reduce the transition fuel mass flow rate and while controlling the power source 200 to reduce the magnitude of the RCB until the fuel utilization increases to within the operating mode fuel utilization range. In some embodiments, the operating mode fuel utilization range is about 35% to about 90%, the fuel utilization range required for the efficient generation of power. In some embodiments, the operating fuel utilization range is about 65% to 85%. In some embodiments, the operating fuel utilization is about 80%. In some embodiments, the operating fuel utilization is about 75%.

In some embodiments, the SOFC system 100 incrementally increases the SOFC fuel mass flow rate while correspondingly reducing the transition fuel mass flow rate and while correspondingly reducing the magnitude of the RCB until the fuel utilization increases to within the operating mode fuel utilization range. The SOFC fuel mass flow rate in power-ready hot standby may be referred to as the power-ready hot standby SOFC fuel mass flow rate. In certain embodiments, the SOFC system 100 increases the SOFC fuel mass flow rate in increments of between about 0.2% and about 2% of the SOFC fuel mass flow rate at full load of the SOFC system 100 until the fuel utilization increases to within the operating mode fuel utilization range. In some embodiments, the SOFC system 100 increases the SOFC fuel mass flow rate in increments of between about 0.4% and about 1% of the SOFC fuel mass flow rate at full load of the SOFC system 100 until the fuel utilization increases to within the operating mode fuel utilization range. In some embodiments, the SOFC system 100 increases the SOFC fuel mass flow rate in increments about 0.1% of the SOFC fuel mass flow rate at full load of the SOFC system 100 until the fuel utilization increases to within the operating mode fuel utilization range. In some embodiments, the SOFC system 100 increases the SOFC fuel mass flow rate in increments about 0.6% of the SOFC fuel mass flow rate at full load of the SOFC system 100 until the fuel utilization increases to within the operating mode fuel utilization range. In some embodiments, the SOFC system 100 increases the SOFC fuel mass flow rate in increments of less than 1.5% of the SOFC fuel mass flow rate at full load of the SOFC system 100 until the fuel utilization increases to within the operating mode fuel utilization range. The number of incremental SOFC fuel addition steps used to transition RCB off is typically 5 for a total increase in SOFC fuel of 2% but can vary total increases from 1% to 10%. This ensures a gradual increase in the fuel utilization from within the standby mode fuel utilization range to within the operating mode fuel utilization range. In some embodiments, the SOFC fuel flow mass flow rate is increased in increments of 0.6% from 0% to 1-5% of the design full-load SOFC fuel mass flow rate. In some embodiments, the SOFC fuel flow mass flow rate is increased in increments of 0.6% from 0% to 3% of the design full-load SOFC fuel mass flow rate. In some embodiments, the SOFC fuel flow mass flow rate is increased in increments of 0.1% from 0% to 3% of the design full-load SOFC fuel mass flow rate.

In some embodiments, the transition fuel mass flow rate is held constant at a relatively high mass flow rate.

In other embodiments, the SOFC system 100 increases the SOFC fuel mass flow rate while reducing at least one of the transition fuel mass flow rate and the magnitude of the RCB until the fuel utilization increases to within the operating mode fuel utilization range. For instance, the SOFC system 100 may only reduce the transition fuel mass flow rate while increasing the SOFC fuel mass flow rate until the fuel utilization increases to within the operating mode fuel utilization range or may only reduce the magnitude of the RCB while increasing the SOFC fuel mass flow rate until the fuel utilization increases to within the operating mode fuel utilization range.

After the fuel utilization increases from within the anode-protection/reduction fuel utilization range to within the operating mode fuel utilization range, the SOFC system 100 stops applying the RCB to the SOFC unit 180, as block 518 indicates. For instance, responsive to determining that the fuel utilization has increased to within the operating mode fuel utilization range, the controller 190 controls the power source 200 to stop applying the RCB to the SOFC unit 180. This cessation of the RCB may occur in incremental steps as described above.

3.3 Transitioning from Power-Ready Hot Standby Mode to Normal Operating Mode

Figure 6:
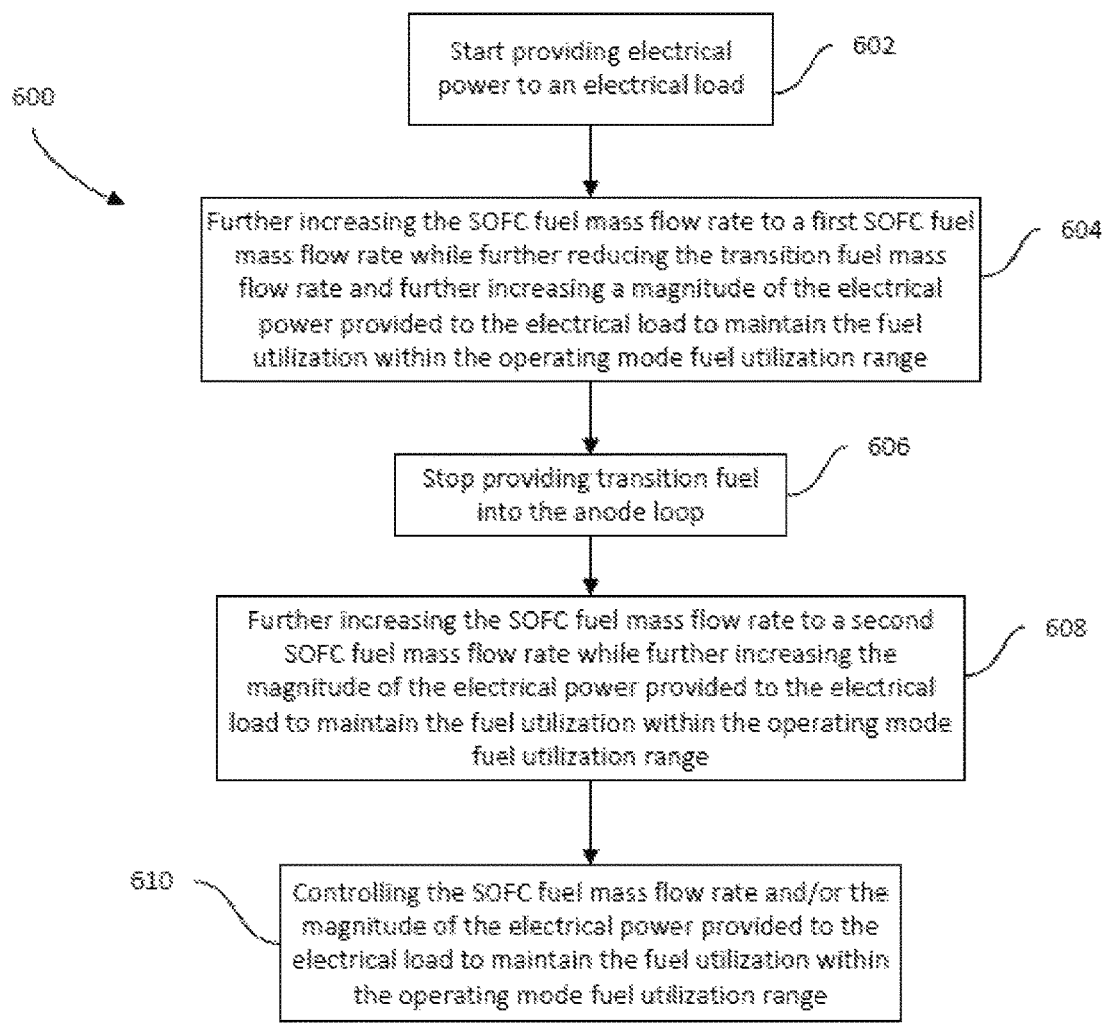
FIG. 6 is a flowchart illustrating a method of operating the SOFC system of FIG. 1 to transition from power-ready hot standby operating mode to an operating mode.

FIG. 6 is a flowchart illustrating a method 600 of operating the SOFC system 100 to transition the SOFC system 100 from power-ready hot standby mode to normal operations mode. In various embodiments, instructions stored in the memory of the controller 190 and executed by the CPU of the controller 190 represent the method 500. Although the method 600 is described with respect to the flowchart shown in FIG. 6, other methods of performing the acts described below may be employed. In certain embodiments, the blocks are performed in the order in which they are shown; while in other embodiments the blocks are performed in different orders. The method 600 starts responsive to the controller 190 receiving an input (such as from an operator via an input device) including an instruction to begin transitioning the SOFC system 100 from power-ready hot standby mode to a normal operating mode.

After stopping the application of the RCB to the SOFC unit 180, the SOFC system 100 starts providing electrical power to the electrical load 300, as block 602 indicates. For instance, responsive to the magnitude of the RCB reaching zero, the controller 190 controls the SOFC unit 180 to start draw electrical power to the electrical load 300.

After starting to draw electrical power to the electrical load 300, the SOFC system 100 increases the SOFC fuel mass flow rate to a first operating SOFC fuel mass flow rate while reducing the transition fuel mass flow rate and while increasing the magnitude of the drawn electrical power to maintain the fuel utilization within the operating mode fuel utilization range, as block 604 indicates. For instance, the controller 190 controls the SOFC fuel flow control device 106a to increase the SOFC fuel mass flow rate while controlling the transition fuel flow control device 104a to reduce the transition fuel mass flow rate and while controlling the SOFC unit 180 to increase the magnitude of the electrical power drawn to the electrical load 300. In some embodiments, the first operating SOFC fuel mass flow rate is between about 35% and about 65% of the SOFC fuel mass flow rate at full load of the SOFC system 100. In some embodiments, the first operating SOFC fuel mass flow rate is about 50% of the SOFC fuel mass flow rate at full load of the SOFC system 100.

In certain embodiments, the SOFC system 100 incrementally increases the SOFC fuel mass flow rate to the first operating SOFC fuel mass flow rate while correspondingly reducing the transition fuel mass flow rate and while correspondingly increasing the magnitude of the electrical power provided to the electrical load to maintain the fuel utilization within the operating mode fuel utilization range. In some embodiments, the SOFC system 100 increases the SOFC fuel mass flow rate to the first operating SOFC fuel mass flow rate in increments of between about 1% and about 10% of the SOFC fuel mass flow rate at full load of the SOFC system 100. In some embodiments, the SOFC system 100 increases the SOFC fuel mass flow rate to the first operating SOFC fuel mass flow rate in increments of between about 2% and about 5% of the SOFC fuel mass flow rate at full load of the SOFC system 100. In some embodiments, the SOFC system 100 increases the SOFC fuel mass flow rate to the first operating SOFC fuel mass flow rate in increments of between about 3% of the SOFC fuel mass flow rate at full load of the SOFC system 100. This gradual increase in the SOFC fuel mass flow rate to the first operating SOFC fuel mass flow rate, which enables the controller 190 to control the transition fuel flow control device 104a and the SOFC unit 180 to adequately maintain the fuel utilization within the operating mode fuel utilization range.

During power generation, small increases in the SOFC fuel mass flow rate are required to maintain the targeted conditions for steam to carbon ratio for internal reforming of the SOFC fuel. The SOFC unit 180 current is also increased in a synchronized manner to generate more power. More steam will be generated that is recycled in the anode loop to (re-) establish the targeted steam to carbon ratio. The more that an incremental SOFC unit 180 current increase lags the incremental SOFC fuel mass flow rate increase, the more the steam to carbon ratio will fall below the steady state target, which tends to cause system temperature to be elevated above the desired temperature range. Conversely, if an incremental SOFC unit 180 current increase increases faster than the SOFC fuel mass flow increase, fuel starvation can occur at the anodes near the exit of the SOFC unit 180, in turn causing oxidation or other degradation mechanisms.

In the normal process for loading the SOFC unit 180, the steady state steam to carbon ratio is sufficient (≥2.3) to prevent the above described adverse effects. However, it is preferable for the steam to carbon ratio to be higher and to never decrease, even momentarily, during the incremental increases in SOFC unit 180 loading. Therefore, to improve the synchronization of the SOFC fuel mass flow rate and SOFC unit 180 current increases, the SOFC fuel mass flow rate increments are typically executed to slightly lead the incremental increase in the SOFC unit 180 current load by a short time interval to account for the time required for the increased SOFC fuel flow to reach the fuel cell site after the flow control device is increased, and the control response and residence time for anode gas (SOFC fuel and transition gas) to traverse the piping between the SOFC fuel flow control device 106a and the fuel cells. The converse of this SOFC fuel increase leading process is performed during unloading of the SOFC unit 180. This leading-step process minimizes momentary deviations in the steam to carbon ration and fuel utilization away from their targets ranges.

The above described process, in which the increase in SOFC fuel mass flow rate slightly leads the SOFC unit 180 current increase (or vice versa for unloading) is not required in the above described transition off of RCB because the steps in both RCB and SOFC fuel mass flow rate increase is much smaller. In other words, a SOFC fuel mass flow rate increase without a reduction in the RCB would not yield carbon formation when the system chemistry reaches the new steady state (i.e., the recirculating flow of anode gas around the anode loop has had sufficient time after the fuel addition so that the composition at any points along the flow path no longer changes with time). However, RCB likely needs to be reduced prior to the step-increase in the SOFC fuel mass flow.

In other embodiments, the SOFC system 100 increases the SOFC fuel mass flow rate to the first operating SOFC fuel mass flow rate while at least one of reducing the transition fuel mass flow rate and increasing the magnitude of the electrical power provided to the electrical load 300 to maintain the fuel utilization within the operating mode fuel utilization range. For instance, the SOFC system 100 may only reduce the transition fuel mass flow rate while increasing the SOFC fuel mass flow rate to the first operating SOFC fuel mass flow rate or may only increase the magnitude of the provided electrical power while increasing the SOFC fuel mass flow rate to the first operating SOFC fuel mass flow rate.

After the SOFC fuel mass flow rate has reached the first operating SOFC fuel mass flow rate, the SOFC system 100 stops providing transition fuel into the anode loop of the SOFC system, as block 606 indicates, to stop supplying transition fuel to the anode side of the SOFC unit 180. In some embodiments, the transition fuel may be decreased to a small controllable value when the first operating SOFC fuel mass flow rate has been reached. For instance, the controller 190 controls the transition fuel flow control device 104a to stop providing transition fuel from the transition fuel source 104 into the anode loop of the SOFC system 100.

When the transition gas has been turned off, or can be turned off at any time, the SOFC system 100 increases the SOFC fuel mass flow rate from the first operating SOFC fuel mass flow rate to a second operating SOFC fuel mass flow rate while increasing the magnitude of the electrical power provided to the electrical load 300 to maintain the fuel utilization within the operating mode fuel utilization range, as block 608 indicates. For instance, responsive to the transition fuel mass flow rate reaching zero, the controller 190 controls the SOFC fuel flow control device 106a to increase the SOFC fuel mass flow rate from the first operating SOFC fuel mass flow rate to the second operating SOFC fuel mass flow rate while controlling the SOFC unit 180 to increase the magnitude of the electrical power provided to the electrical load 300. In this example embodiment, the second operating SOFC fuel mass flow rate is up to about 100% of the SOFC fuel mass flow rate at full load of the SOFC system 100.

In certain embodiments, the SOFC system 100 incrementally increases the SOFC fuel mass flow rate from the first operating SOFC fuel mass flow rate to the second operating SOFC fuel mass flow rate while correspondingly increasing the magnitude of the electrical power provided to the electrical load 300 to maintain the fuel utilization within the operating mode fuel utilization range. In some embodiments, the SOFC system 100 increases the SOFC fuel mass flow rate from the first operating SOFC fuel mass flow rate to the second operating SOFC fuel mass flow rate in increments of between about 1% and about 10% of the SOFC fuel mass flow rate at full load of the SOFC system 100. In some embodiments, the SOFC system 100 increases the SOFC fuel mass flow rate from the first operating SOFC fuel mass flow rate to the second operating SOFC fuel mass flow rate in increments of between about 2% and about 5% of the SOFC fuel mass flow rate at full load of the SOFC system 100. In some embodiments, the SOFC system 100 increases the SOFC fuel mass flow rate from the first operating SOFC fuel mass flow rate to the second operating SOFC fuel mass flow rate in increments about 3% of the SOFC fuel mass flow rate at full load of the SOFC system 100. This ensures a gradual increase in the SOFC fuel mass flow rate to the second operating SOFC fuel mass flow rate, which enables the controller 190 to control the SOFC unit 180 to adequately maintain the fuel utilization within the operating mode fuel utilization range, which yields optimal electrical conversion efficiency, and while sustaining sufficient steam to carbon ratio at all times. In some embodiments, an increase in the SOFC fuel mass flow rate may slightly lead the increase in the SOFC unit 180 current load as described above.

At this point, the SOFC system 100 is in operating mode, and the SOFC system 100 controls the SOFC fuel mass flow rate and/or the magnitude of the electrical power drawn by the electrical load 300 to maintain the fuel utilization within the operating mode fuel utilization range, as block 610 indicates, until receiving instructions to transition to another operating mode (e.g., power-ready hot standby or to shutdown). For instance, the controller 190 controls at least one of the SOFC fuel flow control device 106a (to control the SOFC fuel mass flow rate) and the SOFC unit 180 (to control the magnitude of the electrical power provided to the electrical load 300) to maintain the fuel utilization within the operating mode fuel utilization range.

While in the operating mode, cathodes 150 reduce the oxygen in the oxidant into oxygen ions that diffuse through the electrolytes 170 into the anodes 160. The anodes 160 oxidize the SOFC fuel, which gives off electrons that flow through an electrical load 300. The oxidant flow control device 102a may control the oxidant mass flow rate as required to support the electrical power drawn from the SOFC unit 180. In some embodiments, the oxidant flow control device 102a controls the oxidant mass flow rate between 50 and 100% of the full-load oxidant mass flow rate.

3.4 Transitioning from Operating Mode to Power-Ready Hot Standby Mode

Figure 7:
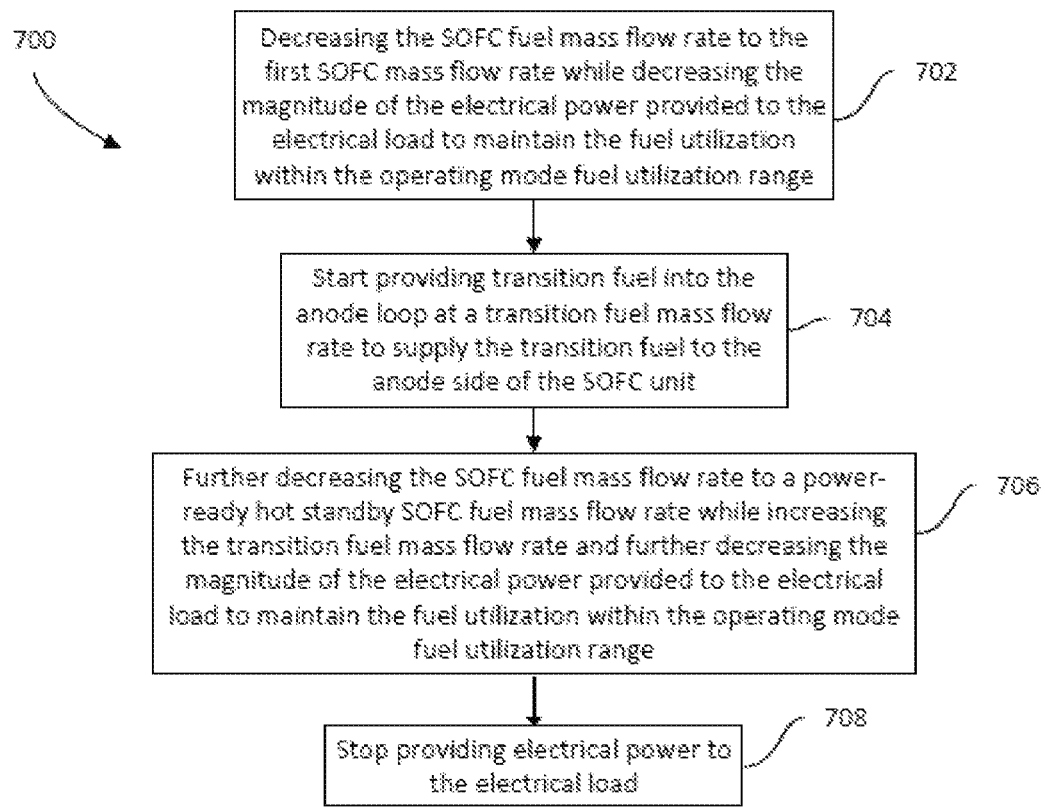
FIG. 7 is a flowchart illustrating a method of operating the SOFC system of FIG. 1 to transition from an operating mode to a power-ready hot standby mode.

FIG. 7 is a flowchart illustrating a method 700 of operating the SOFC system 100 to transition the SOFC system 100 from operating mode to standby mode. In various embodiments, instructions stored in the memory of the controller 190 and executed by the CPU of the controller 190 represent the method 700. Although the method 700 is described with respect to the flowchart shown in FIG. 7, other methods of performing the acts described below may be employed. In certain embodiments, the blocks are performed in the order in which they are shown, while in other embodiments the blocks are performed in different orders.

The method 700 starts responsive to the controller 190 receiving an input (such as from an operator via an input device) including an instruction to begin transitioning the SOFC system 100 from operating mode to power-ready hot standby mode. In response, the SOFC system 100 decreases the SOFC fuel mass flow rate from the second operating SOFC fuel mass flow rate to the first operating SOFC fuel mass flow rate while decreasing the magnitude of the electrical power provided to the electrical load 300 to maintain the fuel utilization within the operating mode fuel utilization range, as block 702 indicates. For instance, the controller 190 controls the SOFC fuel flow control device 106a to decrease the SOFC fuel mass flow rate from the second operating SOFC fuel mass flow rate to the first operating SOFC fuel mass flow rate while controlling the SOFC unit 180 to decrease the magnitude of the electrical power provided to the electrical load 300.

In certain embodiments, the SOFC system 100 incrementally decreases the SOFC fuel mass flow rate from the second operating SOFC fuel mass flow rate to the first operating SOFC fuel mass flow rate while correspondingly decreasing the magnitude of the electrical power provided to the electrical load 300 to maintain the fuel utilization within the operating mode fuel utilization range. In some embodiments, the SOFC system 100 decreases the SOFC fuel mass flow rate from the second operating SOFC fuel mass flow rate to the first operating SOFC fuel mass flow in increments of between about 1% and about 10% of the SOFC fuel mass flow rate at full load of the SOFC system 100. In some embodiments, the SOFC system 100 decreases the SOFC fuel mass flow rate from the second operating SOFC fuel mass flow rate to the first operating SOFC fuel mass flow in increments of between about 2% and about 5% of the SOFC fuel mass flow rate at full load of the SOFC system 100. In some embodiments, the SOFC system 100 decreases the SOFC fuel mass flow rate from the second operating SOFC fuel mass flow rate to the first operating SOFC fuel mass flow in increments about 3% of the SOFC fuel mass flow rate at full load of the SOFC system 100. This incremental decrease ensures a gradual decrease in the SOFC fuel mass flow rate to the first operating SOFC fuel mass flow rate, which enables the controller 190 to control the SOFC unit 180 to adequately maintain the fuel utilization within the operating mode fuel utilization range. As described above, the SOFC unit 180 current load may be decreased in one incremental step slightly before the SOFC fuel mass flow rate is decreased in the same step.

After the SOFC mass flow rate reaches the first operating SOFC fuel mass flow rate, the SOFC system 100 starts providing transition fuel into the anode loop of the SOFC system 100 to supply transition fuel to the anode side of the SOFC unit 180, as block 704 indicates. For instance, the controller 190 controls the transition fuel flow control device 104a to receive the transition fuel from the transition fuel source 104 and provide the transition fuel into the anode loop of the SOFC system 100 (as described above) at a transition fuel mass flow rate. The amount of transition fuel used starts at a small controllable value that is increased in increments as the SOFC fuel mass flow rate and the SOFC unit 180 current are decreased. Eventually, the transition fuel flow rate will reach a value greater than that used in. The final transition fuel flow rate is higher—equal to that rate while the RCB was previously transitioned off.

After starting to provide transition fuel into the anode loop of the SOFC system 100, the SOFC system 100 decreases the SOFC fuel mass flow rate from the first operating SOFC fuel mass flow rate to a power-ready hot standby SOFC fuel mass flow rate while increasing the transition fuel mass flow rate and while decreasing the magnitude of the electrical power provided to the electrical load 300 to maintain the fuel utilization within the operating mode fuel utilization range, as block 706 indicates. For instance, the controller 190 controls the SOFC fuel flow control device 106a to decrease the SOFC fuel mass flow rate from the first operating SOFC fuel mass flow rate to the power-ready hot standby SOFC fuel mass flow rate while controlling the transition fuel flow control device 104a to increase the transition fuel mass flow rate and while controlling the SOFC unit 180 to decrease the magnitude of the electrical power provided to the electrical load 300. In this example embodiment, the power-ready hot standby SOFC fuel mass flow rate is between about 1% and about 10% of the SOFC fuel mass flow rate at full load of the SOFC system 100. In other embodiments, the power-ready hot standby SOFC fuel mass flow rate is about 3% of the SOFC fuel mass flow rate at full load of the SOFC system 100.

In certain embodiments, the SOFC system 100 incrementally decreases the SOFC fuel mass flow rate from the first operating SOFC fuel mass flow rate to the power-ready hot standby SOFC fuel mass flow rate while correspondingly increasing the transition fuel mass flow rate and while correspondingly decreasing the magnitude of the electrical power provided to the electrical load 300 to maintain the fuel utilization within the operating mode fuel utilization range. In certain embodiments, the SOFC system 100 decreases the SOFC fuel mass flow rate from the first operating SOFC fuel mass flow rate to the power-ready hot standby SOFC fuel mass flow rate in increments of between about 1% and about 10% of the SOFC fuel mass flow rate at full load of the SOFC system 100. In other embodiments, the SOFC system 100 decreases the SOFC fuel mass flow rate from the first operating SOFC fuel mass flow rate to the power-ready hot standby SOFC fuel mass flow rate in increments of between about 2% and about 5% of the SOFC fuel mass flow rate at full load of the SOFC system 100. In other embodiments, the SOFC system 100 decreases the SOFC fuel mass flow rate from the first operating SOFC fuel mass flow rate to the power-ready hot standby SOFC fuel mass flow rate in increments of about 3% of the SOFC fuel mass flow rate at full load of the SOFC system 100. This incremental decrease in the SOFC fuel mass flow rate ensures a gradual decrease in the SOFC fuel mass flow rate to the power-ready hot standby SOFC fuel mass flow rate, which enables the controller 190 to control the transition fuel flow control device 104a and the SOFC unit 180 to adequately maintain the fuel utilization within the operating mode fuel utilization range.

In other embodiments, the SOFC system 100 decreases the SOFC fuel mass flow rate from the first operating SOFC fuel mass flow rate to the power-ready hot standby SOFC fuel mass flow rate while at least one of increasing the transition fuel mass flow rate and decreasing the magnitude of the electrical power provided to the electrical load 300 to maintain the fuel utilization within the operating mode fuel utilization range. For instance, the SOFC system 100 may only increase the transition fuel mass flow rate while decreasing the SOFC fuel mass flow rate from the first operating SOFC fuel mass flow rate to the power-ready hot standby SOFC fuel mass flow rate or may only decrease the magnitude of the provided electrical power while decreasing the SOFC fuel mass flow rate from the first operating SOFC fuel mass flow rate to the power-ready hot standby SOFC fuel mass flow rate.

After the SOFC fuel mass flow rate reaches the power-ready hot standby SOFC fuel mass flow rate, the SOFC system 100 stops providing electrical power to the electrical load 300, as block 708 indicates. For instance, responsive to the SOFC fuel mass flow rate reaching the power-ready hot standby SOFC fuel mass flow rate, the controller 190 controls the SOFC unit 180 to stop providing electrical power to the electrical load 300.

At the cessation of SOFC unit 180 power generation, the heat source 185 must be turned on in order to provide a heat input needed to replace the electrical losses that were maintaining the temperature of the SOFC unit 180. The heat input from heat source 185 may be adjusted to control the cool-down rate of the SOFC unit 180.

3.5 Transitioning from Power-Ready Hot Standby Mode to Shutdown Mode

Figure 8:
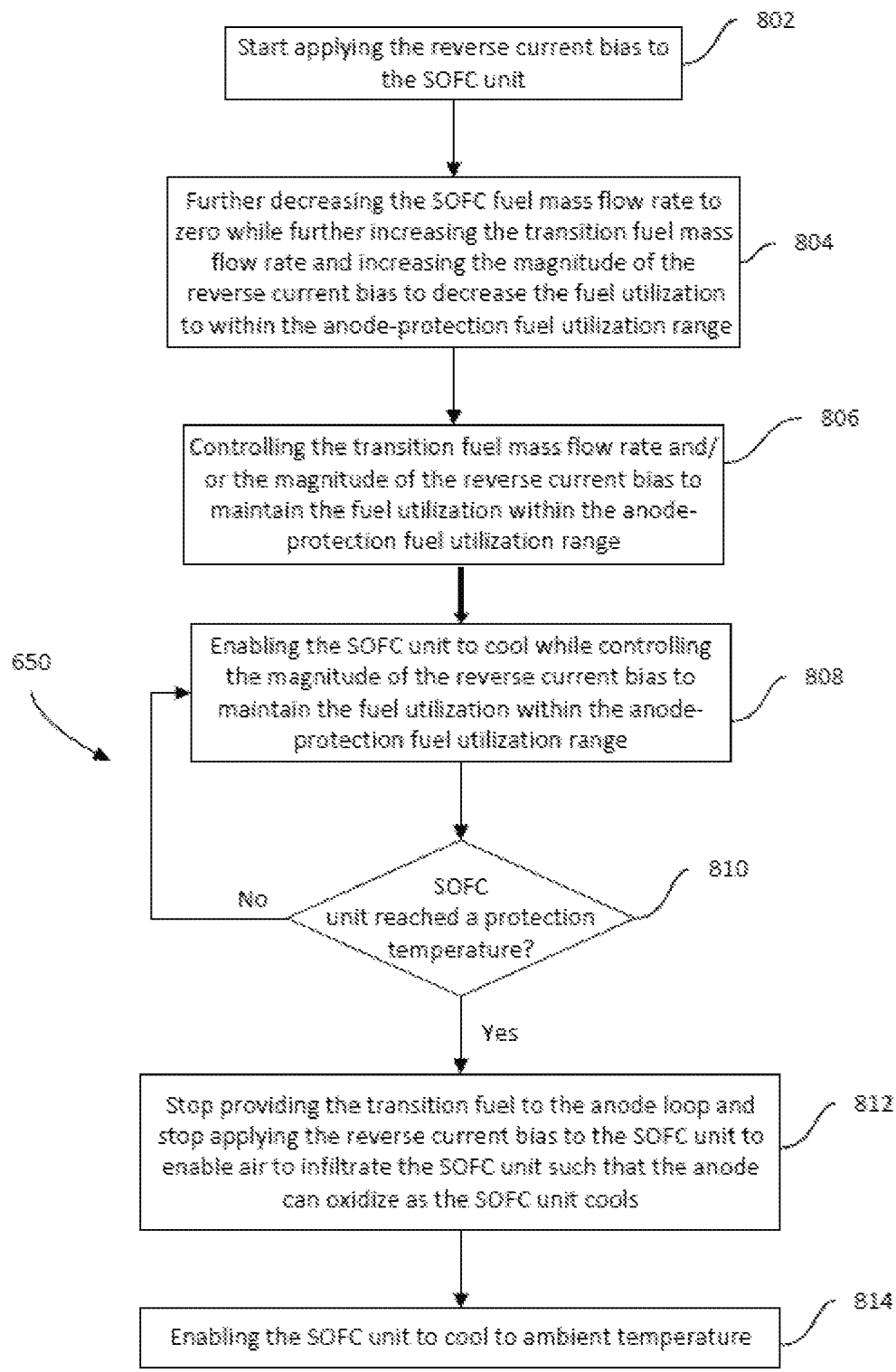
FIG. 8 is a flowchart illustrating a method of operating the SOFC system of FIG. 1 to transition from a power-ready hot standby mode to a shutdown mode.

FIG. 8 is a flowchart illustrating a method 800 of operating the SOFC system 100 to transition the SOFC system 100 from power-ready hot standby mode to shutdown mode. In various embodiments, instructions stored in the memory of the controller 190 and executed by the CPU of the controller 190 represent the method 800. Although the method 800 is described with respect to the flowchart shown in FIG. 8, other methods of performing the acts described below may be employed. In certain embodiments, the blocks are performed in the order in which they are shown; while in other embodiments the blocks are performed in different orders.

After stopping the application of electrical power to the electrical load 300, the SOFC system 100 starts applying the RCB to the SOFC unit 180, as block 802 indicates. For instance, the controller 190 controls the power source 200 to apply the RCB to the SOFC unit 180. The initial RCB is configured to lower the fuel utilization from the operating fuel utilization range to a fuel utilization of 75%. As the SOFC fuel mass flow rate is incrementally decreased to zero, the RCB is incrementally increased to result in a fuel utilization of 50%.

The SOFC system 100 decreases the SOFC fuel mass flow rate from the power-ready hot standby SOFC fuel mass flow rate to zero, thereby stopping the supply of SOFC fuel to the anode side of the SOFC unit 180, in a series of incremental steps while increasing the transition fuel mass flow rate. In some embodiments, the transition fuel mass flow rate may have a higher value that is maintained with the SOFC fuel mass flow rate is decreased to zero. Additionally, the SOFC system 100 increased the magnitude of the RCB to decrease the fuel utilization to within the anode-protection fuel utilization range, as block 804 indicates. For instance, the controller 190 controls the SOFC fuel flow control device 106a to decrease the SOFC fuel mass flow rate from the power-ready hot standby SOFC fuel mass flow rate to zero while controlling the transition fuel flow control device 104a to increase the transition fuel mass flow rate and while controlling the power source 200 to increase the magnitude of the RCB to decrease the fuel utilization to within the anode-protection fuel utilization range.

In some embodiments, the SOFC system 100 incrementally decreases the SOFC fuel mass flow rate from the power-ready hot standby SOFC fuel mass flow rate to zero while correspondingly increasing the transition fuel mass flow rate and while correspondingly increasing the magnitude of the RCB to decrease fuel utilization to within the anode-protection fuel utilization range. In some embodiments, the SOFC system 100 decreases the SOFC fuel mass flow rate in increments of between about 0.2% and about 2% of the SOFC fuel mass flow rate at full load of the SOFC system 100 until the fuel utilization decreases to zero. In some embodiments, the SOFC system 100 decreases the SOFC fuel mass flow rate in increments of between about 0.4% and about 1% of the SOFC fuel mass flow rate at full load of the SOFC system 100 until the fuel utilization decreases to zero. The number of incremental SOFC fuel decreases steps used to while transitioning the transition RCB on is typically five for a total increase in SOFC fuel of 2% but can vary from 1% to 10%. This ensures a gradual decrease in the fuel utilization from within the power-ready hot standby range to within the anode-protection fuel utilization range. In some embodiments, the SOFC fuel flow mass flow rate is decreased in increments of 0.6% from 0% to 3% of the design full-load SOFC fuel mass flow rate.

In other embodiments, the SOFC system 100 decreases the SOFC fuel mass flow rate from the power-ready hot standby SOFC fuel mass flow rate to zero while increasing at least one of the transition fuel mass flow rate and the magnitude of the RCB until the fuel utilization decreases to within the anode-protection fuel utilization range. For instance, the SOFC system 100 may only increase the transition fuel mass flow rate while decreasing the SOFC fuel mass flow rate from the power-ready hot standby SOFC fuel mass flow rate to zero or may only increase the magnitude of the RCB while decreasing the SOFC fuel mass flow rate from the power-ready hot standby SOFC fuel mass flow rate to zero.

At this point, the SOFC system controls the transition fuel mass flow rate and/or the magnitude of the RCB to maintain the fuel utilization within the anode-protection fuel utilization range, as block 806 indicates. For instance, the controller 190 controls the transition fuel flow control device 104a (to control the transition fuel mass flow rate) and/or controls the power source 200 (to control the magnitude of the RCB)

to maintain the fuel utilization within the anode-protection fuel utilization range. The anode-protection fuel utilization must be maintained during the shutdown/cool down to protect the anodes from rapid oxidation at the higher, operating temperature.

With the fuel utilization being maintained in the anode-protection range by the application of the RCB and provision of transition gas, the SOFC system 100 may begin the cool down process. The SOFC system 100 enables the SOFC unit 180 to cool from the operating temperature while controlling the magnitude of the RCB to maintain the fuel utilization within the standby mode fuel utilization range, as block 808 indicates. In some embodiments, the transition gas is maintained at a lower value than that used to when electrically loading/unloading the SOFC unit 180 and transitioning the RCB on/off. For instance, the controller 190 controls the power source 200 to control the magnitude of the RCB to maintain the fuel utilization within the standby mode fuel utilization range while controlling the heat source 185 and/or the oxidant flow control device 102a to enable the SOFC unit 180 to cool.

In some embodiments, the oxidant mass flow rate may be maintained at about 65-90% of the full-load design oxidant mass flow rate. In some embodiments, the oxidant mass flow rate may be maintained at about 70-80% of the full-load design oxidant mass flow rate. In some embodiments, the oxidant mass flow rate may be maintained at about 75% of the full-load design oxidant mass flow rate. In some embodiments, the oxidant mass flow rate is between 50% and 100% of the oxidant mass flow rate at full load.

The SOFC system 100 monitors the SOFC unit temperature to determine whether it has reached a protection temperature (which may be known as a "predetermined temperature"), as diamond 810 indicates. For instance, the controller 190 monitors the SOFC unit temperature to determine whether it has reached the protection temperature. In some embodiments, the protection temperature is between about 450 degrees centigrade and about 750 degrees centigrade. In some embodiments, the protection temperature is between about 450 degrees centigrade and about 750 degrees centigrade. In some embodiments, the protection temperature is between about 550 degrees centigrade and about 750 degrees centigrade. In some embodiments, the protection temperature is between about 600 degrees centigrade and about 650 degrees centigrade. In some embodiments, the protection temperature is about 650 degrees centigrade.

Once the SOFC system determines at diamond 810 that the SOFC unit temperature has reached the protection temperature, the SOFC system 100 stops providing transition fuel into the anode loop of the SOFC system 100 to stop supplying transition fuel to the anode side of the SOFC unit 180 and stops applying the RCB to the SOFC unit 180, as block 812 indicates. For instance, responsive to determining that the SOFC unit temperature has reached the protection temperature, the controller 190 controls the transition fuel flow control device 104a to stop providing transition fuel from the transition fuel source 104 into the anode loop of the SOFC system and controls the power source 200 to stop applying the RCB to the SOFC unit 180. This enables air to infiltrate the SOFC unit such that the anode can oxidize as the SOFC unit cools from the protective temperature to the oxidation temperature (e.g., about 400 degrees centigrade to about 500 degrees centigrade). That is, since no SOFC or transition fuel exists at the anode to consume the $O_2$ flowing from the cathode, the $O_2$ oxidizes the anode. This controlled oxidation from the protective temperature to the oxidation temperature forms a thin protective oxide layer on the Ni in the anode as compared to oxidation that would occur had the anode been allowed to oxidize from the higher operating temperature to the oxidation temperature. Since the protective oxide layer is relatively thin, the volume change of the Ni to NiO as it is oxidized is small compared to the volume change that would occur had the anode been allowed to oxidize from the higher operating temperature to the oxidation temperature and thus form a relatively thicker protective oxide layer. This means that the anode can tolerate cyclical oxidation and re-reduction cycles without fuel cell degradation.

In some embodiments, the SOFC system 100 simultaneously stops providing the transition fuel into the anode loop of the SOFC system 100 and stops applying the RCB to the SOFC unit 180. In some embodiments, the SOFC system 100 does so sequentially and in either order. In some embodiments, the SOFC system 100 stops providing the RCB once the SOFC unit temperature reaches a particular value, such as 600 degrees centigrade. In some embodiments, the SOFC system 100 stops providing the transition fuel to the SOFC unit 180 once the SOFC unit temperature reaches a particular value, such as 650 degrees centigrade.

The SOFC system 100 then enables the SOFC unit to cool to ambient temperature, as block 814 indicates. For instance, the controller 190 controls the heat source 185 and/or the oxidant flow control device 102a to enable the SOFC unit 180 to cool at a predetermined rate. In some embodiments, the predetermined rate is between about 1 and about 10 degrees centigrade par minute. In some embodiments, the predetermined rate is between about 1 and about 5 degrees centigrade par minute. In some embodiments, the predetermined rate is about 3 degrees centigrade per minute.

3.6 Transitioning from Operating Mode to Shut-Down Mode

Figure 9:
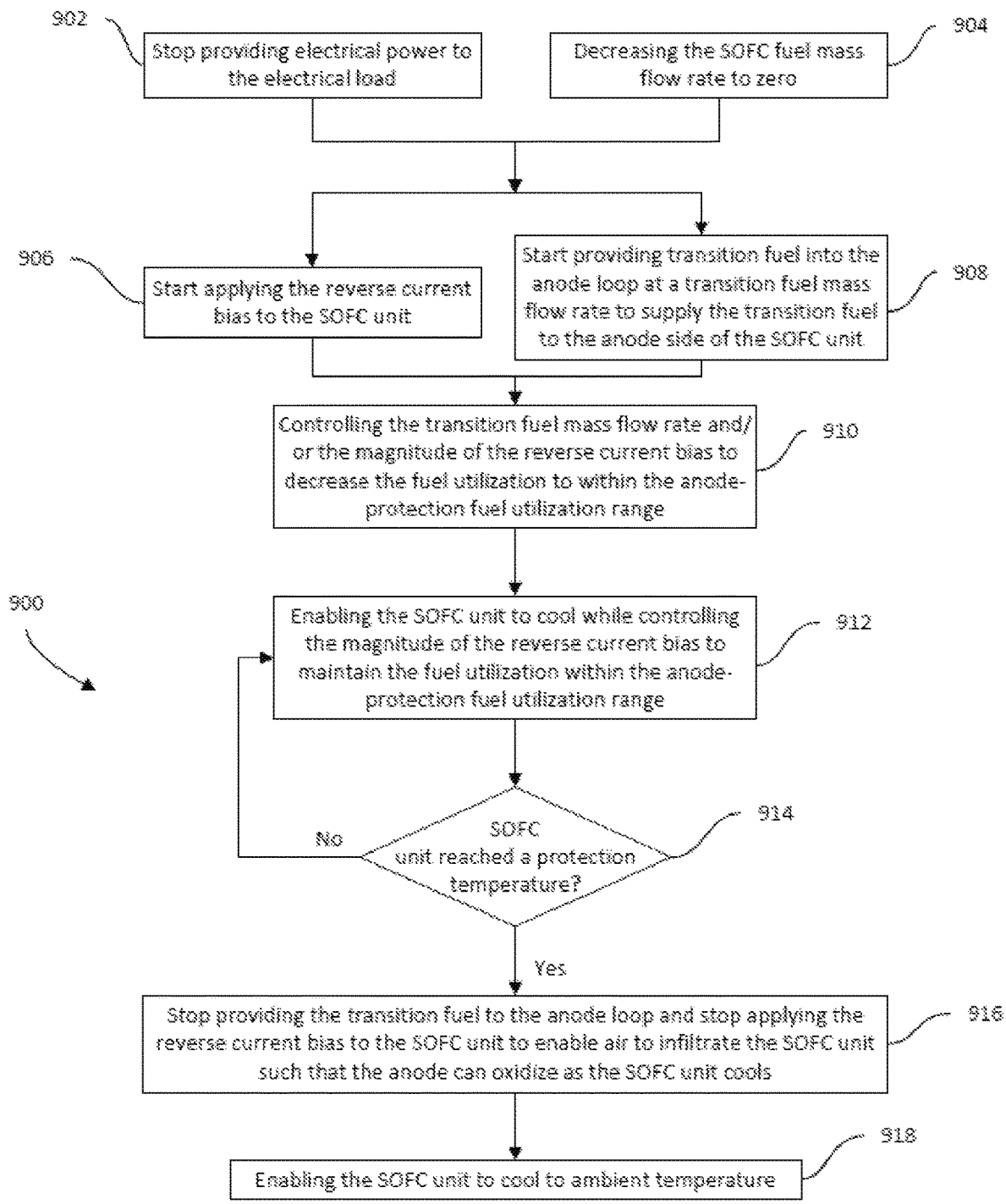
FIG. 9 is a flowchart illustrating a method of operating the SOFC system of FIG. 1 to transition from operating mode to shut-down mode.

FIG. 9 is a flowchart illustrating a method 900 of operating the SOFC system 100 to transition the SOFC system 100 from operating mode to shut-down mode. In various embodiments, instructions stored in the memory of the controller 190 and executed by the CPU of the controller 190 represent the method 900. Although the method 900 is described with respect to the flowchart shown in FIG. 9, other methods of performing the acts described below may be employed. In some embodiments, the blocks and/or the diamonds are performed in the order in which they are shown, while in other embodiments the blocks and/or the diamonds are performed in different orders. This method 900 describes an emergency shutdown due to some system fault that requires immediate shutdown either for safety or to protect the asset (the fuel cell). This system fault requires the immediate cessation of the provision of SOFC fuel of the SOFC unit 180. Stopping the flow of the SOFC fuel the requires stopping the SOFC unit 180 power production.

The method 900 starts responsive to the controller 190 receiving an input (such as from an operator via an input device) including an instruction to begin transitioning the SOFC system 100 from operating mode to shut-down mode. In response, the SOFC system 100 stops providing electrical power to the electrical load 300, as block 902 indicates, and decreases the SOFC fuel mass flow rate to zero to stop supplying SOFC fuel to the anode side of the SOFC unit 180, as block 904 indicates. For instance, the controller 190 controls the SOFC unit 180 to decrease the magnitude of the electrical power provided to the electrical load 300 and controls the SOFC fuel flow control device 106a to decrease the SOFC fuel mass flow rate to zero. These steps may be performed simultaneously or sequentially in either order.

The SOFC system 100 then starts applying the RCB to the SOFC unit 180, as block 906 indicates, and starts providing transition fuel to the anode side of the SOFC unit 180, as block 908 indicates. For instance, the controller 190 controls the power source 200 to apply the RCB to the SOFC unit 180 and controls the transition fuel flow control device 104a to receive the transition fuel from the transition fuel source 104 and provide the transition fuel into the SOFC system 100 (as described above) at a transition fuel mass flow rate. In some embodiments, the transition fuel mass flow is at a lower value to conserve its use. While these steps are performed simultaneously in this example embodiment, they may be performed sequentially in other embodiments (in either order).

The SOFC system 100 controls the magnitude of the RCB to decrease the fuel utilization to within the anode-protection fuel utilization range, as block 910 indicates. For instance, the controller 190 controls the transition fuel flow control device 104a (to control the transition fuel mass flow rate) and/or controls the power source 200 (to control the magnitude of the RCB) to decrease the fuel utilization to within the anode-protection fuel utilization range.

The SOFC system 100 enables the SOFC unit 180 to cool from the operating temperature while controlling the magnitude of the RCB and/or the transition fuel mass flow rate to maintain the fuel utilization within the anode-protection fuel utilization range, as block 912 indicates. For instance, the controller 190 controls the power source 200 to control the magnitude of the RCB to maintain the fuel utilization within the standby mode fuel utilization range while controlling the heat source 185 and/or the oxidant flow control device 102 to enable the SOFC unit 180 to cool.

The SOFC system 100 monitors the SOFC unit temperature to determine whether it has reached a protection temperature, as diamond 914 indicates. For instance, the controller 190 monitors the SOFC unit temperature to determine whether it has reached the protection temperature. In this example embodiment, the protection temperature is between about 450 degrees centigrade and about 750 degrees centigrade. In other embodiments, the protection temperature is between about 550 degrees centigrade and about 750 degrees centigrade. In other embodiments, the protection temperature is between about 600 degrees centigrade and about 650 degrees centigrade.

Once the SOFC system determines at diamond 914 that the SOFC unit temperature has reached the protection temperature, the SOFC system 100 stops providing transition fuel into the anode loop of the SOFC system 100 to stop supplying transition fuel to the anode side of the SOFC unit 180 and stops applying the RCB to the SOFC unit 180, as block 916 indicates. This enables air to infiltrate the SOFC unit 180 such that the anode can oxidize as the SOFC unit cools to ambient temperature. For instance, responsive to determining that the SOFC unit temperature has reached the protection temperature, the controller 190 controls the transition fuel flow control device 104a to stop providing transition fuel from the transition fuel source 104 into the anode loop of the SOFC system 100 and controls the power source 200 to stop applying the RCB to the SOFC unit 180.

In certain embodiments, the SOFC system 100 simultaneously stops providing the transition fuel to the anode side of the SOFC unit 180 and stops applying the RCB to the SOFC unit. In other embodiments, the SOFC system 100 does so sequentially and in either order. In various embodiments, the SOFC system 100 stops applying the RCB once the SOFC unit temperature reaches a particular value, such as 600 degrees centigrade. In other embodiments, the SOFC system 100 stops providing the transition gas to the SOFC unit 180 once the SOFC unit temperature reaches a particular value, such as 650 degrees centigrade.

The SOFC system 100 then enables the SOFC unit to cool to ambient temperature, as block 918 indicates. For instance, the controller 190 controls the heat source 185 and/or the oxidant flow control device 102a to enable the SOFC unit 180 to cool at a predetermined rate. In some embodiments, the predetermined rate is between about 1 and about 10 degrees centigrade per minute. In some embodiments, the predetermined rate is between about 1 and about 5 degrees centigrade per minute. In other embodiments, the predetermined rate is about 3 degrees centigrade per minute. Too high of a cooling rate can cause stack damage caused by thermal cracking.

Various modifications to the embodiments described herein will be apparent to those skilled in the art. These modifications can be made without departing from the spirit and scope of the present disclosure and without diminishing its intended advantages. It is intended that such changes and modifications be covered by the appended claims.

We claim:

1. A method of transitioning a fuel cell system having a stack comprising a plurality of fuel cells from a shutdown mode at ambient temperature wherein anodes of the fuel cells are free of oxidized metal, to a hot standby mode at a temperature in the range of 800° C. to 1000° C. wherein the anodes of the fuel cells comprise oxidized metal, the method comprising:

flowing an oxidant in a cathode loop of the fuel cell system;

heating the oxidant flowing in the cathode loop to thereby effect heating of the fuel cell stack;

allowing oxidation of a metal contained in the anodes of the fuel cells while the fuel cell stack heats up to a predetermined temperature below the hot standby mode temperature; and inhibiting further oxidation of the metal in the anodes of the fuel cells while the fuel cell stack heats up from the predetermined temperature to the standby temperature by:

applying an RCB to the fuel cell stack while the fuel cell stack is at or below the predetermined temperature; and flowing a transition fuel in an anode loop of the fuel cell system at a mass flow rate sufficient to prevent oxidation of the metal in the anodes.

2. The method of claim 1 wherein the predetermined temperature is in the range of 600° C. to 700° C.

3. The method of claim 2 comprising controlling the heat up of the fuel cell stack at a rate in the range of 1° C. to 10° C. per minute by controlling the mass flow rate and temperature of oxidant flowing in the cathode loop.

4. A method of transitioning between operating modes of a fuel cell system, the fuel cell system comprising:

a fuel cell stack comprising:

a plurality of solid oxide fuel cells, each solid oxide fuel cell comprising an anode, a cathode, and an electrolyte;

an anode loop comprising:

an in-block fueling flowpath comprising a fuel supply manifold, a fuel exhaust manifold, and one or more fueling channels in fluid communication with said fuel supply manifold and said fuel exhaust manifold, wherein each anode is exposed to a fuel flowing in one or more of said fueling channels;

an anode ejector having a fuel supply input, a fuel recycle input, and a combined fuel output;
a fuel recycle conduit in fluid communication with said anode ejector fuel recycle input and said in-block fueling flowpath fuel exhaust manifold; and
a combined fuel supply conduit in fluid communication with said anode ejector combined fuel output and said in-block fueling flowpath fuel supply manifold;
a fuel supply conduit in fluid communication with said anode ejector fuel supply input;
a source of SOFC fuel in fluid communication with said fuel supply conduit;
a source of transition fuel in fluid communication with said fuel supply conduit;
a cathode loop comprising:
an in-block oxidizing flowpath comprising an oxidant supply manifold, an oxidant exhaust manifold, and one or more oxidizing channels in fluid communication with said oxidant supply manifold and said oxidant exhaust manifold, wherein each cathode is exposed to an oxidant flowing in one or more oxidizing channels;
a cathode ejector having an oxidant supply input, an oxidant recycle input, and a combined oxidant output;
an oxidant recycle conduit in fluid communication with said cathode ejector oxidant recycle input and said in-block oxidizing flowpath oxidant exhaust manifold;
a combined oxidant supply conduit in fluid communication with said cathode ejector combined oxidant output and said in-block oxidizing flowpath oxidant supply manifold; and
a heat source positioned to heat an oxidant flowing in the cathode loop;
an oxidant supply conduit in fluid communication with said cathode ejector oxidant supply input; and
an oxidant source in fluid communication with said oxidant supply conduit;
the method of transitioning the fuel cell system from a shutdown mode wherein:
oxidant is flowing through the cathode loop at ambient temperature;
no fuel is flowing in the anode loop; and
no RCB is applied to the fuel cell stack;
to a hot standby mode wherein:
oxidant is flowing through the cathode loop at a hot standby temperature;
transition fuel is flowing from the source into the anode loop at a mass flow rate sufficient to prevent oxidation of the anode;
RCB is applied to the fuel cell stack; and
anode fuel utilization is with an anode-protection fuel utilization range;
said method of transitioning comprising:
maintaining flow of oxidant through the cathode loop;
controlling a heat up of the fuel cell stack by controlling the mass flow rate and temperature of the oxidant flowing through the cathode loop;
when the temperature of the fuel cell stack reaches a predetermined temperature between ambient temperature and hot standby temperature, flowing transition fuel into the anode loop at a mass flow rate sufficient to prevent anode oxidation;
when the temperature of the fuel cell stack is at or below the predetermined temperature, applying RCB to the fuel cell stack; and maintaining control of the heat up of the fuel cell stack by controlling the mass flow rate and temperature of the oxidant flowing through the cathode loop until the temperature of the fuel cell stack reaches a hot standby temperature.

5. The method of claim 4 comprising maintaining flow of oxidant through the cathode loop in the range of 50% to 100% of a full load mass flow rate.

6. The method of claim 5 comprising maintaining flow of oxidant through the cathode loop at about 100% of the full load mass flow rate.

7. The method of claim 4 comprising controlling the heat up of the fuel cell stack by controlling the heat source.

8. The method of claim 4 wherein the hot standby temperature is in the range of 800° C. to 1000° C.

9. The method of claim 8 wherein the hot standby temperature is about 850° C.

10. The method of claim 4 wherein the predetermined temperature is in the range of 450° C. to 750° C.

11. The method of claim 10 wherein the predetermined temperature is about 650° C.

12. The method of claim 4 comprising controlling the heat up of the fuel cell stack from ambient temperature to the predetermined at a rate in the range of 1° C. to 5° C. per minute.

13. The method of claim 12 comprising controlling the heat up of the fuel cell stack from ambient temperature to the predetermined temperature at a rate of about 3° C. per minute.

14. The method of claim 4 comprising controlling the heat up of the fuel cell stack from the predetermined temperature to the hot standby temperature at a rate in the range of 1° C. to 5° C. per minute.

15. The method of claim 14 comprising controlling the heat up of the fuel cell stack from the predetermined temperature to the hot standby temperature at a rate of about 3° C. per minute.

16. The method of claim 4 comprising controlling the heat up of the fuel cell stack from ambient temperature to about 850° C. at a rate in the range of 1° C. to 10° C. per minute.

17. The method of claim 16 comprising controlling the heat up of the fuel cell stack from ambient temperature to about 850° C. at a rate of about 3° C. per minute.

18. A method of transitioning a fuel cell system from a shutdown mode to a hot standby mode, the fuel cell system having a fuel cell stack comprising a plurality of solid oxide fuel cells, each fuel cell comprising an anode and a cathode spaced apart by an electrolyte, an anode loop for providing a fuel to the anodes, and a cathode loop for providing an oxidant to the cathodes,
wherein conditions of the fuel cell system in the shutdown mode include:
an oxidant flowing through the cathode loop at a mass flow rate in the range of about 50% to 100% of a full load mass flow rate at ambient temperature;
no fuel is flowing in the anode loop; and
no RCB is applied to the fuel cell stack;
wherein conditions of the fuel cell system in the hot standby mode include:
an oxidant flowing through the cathode loop at a mass flow rate in the range of about 50% to 100% of a full load mass flow rate at a temperature in the range of 800° C. to 1000° C.;
transition fuel is flowing from the source into the anode loop at a mass flow rate sufficient to prevent oxidation of the anode;

RCB is applied to the fuel cell stack; and
anode fuel utilization is with an anode-protection fuel utilization range;

said method comprising:
maintaining flow of oxidant through the cathode loop at a mass flow rate in the range of about 50% to 100% of a full load mass flow rate;
controlling the heat up of the fuel cell stack from ambient temperature to a predetermined temperature in the range of 600° C. to 700° C. by controlling the mass flow rate and temperature of the oxidant flowing through the cathode loop;
when the fuel cell stack reaches a predetermined temperature between ambient temperature and a temperature in the range of 800° to 1000° C., begin flowing the transition fuel into the anode loop at a mass flow rate sufficient to prevent oxidation of the anode;
when the temperature of the fuel cell stack reaches the predetermined temperature or earlier, applying RCB to the fuel cell stack; and
controlling the heat up of the fuel cell stack from the predetermined temperature to a hot standby temperature in the range of 800° C. to 1000° C. by controlling the mass flow rate and temperature of the oxidant flowing through the cathode loop.

19. The method of claim 18 wherein the predetermined temperature is about 650° C.

20. The method of claim 18 comprising controlling the heat up of the fuel cell stack at a rate in the range of 1° C. to 10° C. per minute.

21. The method of claim 20 comprising controlling the heat up of the fuel cell stack at a rate of about 3° C. per minute.

* * * * *